United States Patent
Nagasaka

(10) Patent No.: US 10,989,426 B2
(45) Date of Patent: Apr. 27, 2021

(54) INFORMATION PROCESSING DEVICE, ELECTRONIC APPARATUS, METHOD, AND PROGRAM

(71) Applicant: SONY CORPORATION, Tokyo (JP)

(72) Inventor: Hideo Nagasaka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 341 days.

(21) Appl. No.: 15/771,203

(22) PCT Filed: Oct. 3, 2016

(86) PCT No.: PCT/JP2016/079333
§ 371 (c)(1),
(2) Date: Apr. 26, 2018

(87) PCT Pub. No.: WO2017/119163
PCT Pub. Date: Jul. 13, 2017

(65) Prior Publication Data
US 2018/0320915 A1    Nov. 8, 2018

(30) Foreign Application Priority Data
Jan. 7, 2016    (JP) .................................. 2016-001654

(51) Int. Cl.
*F24F 11/30* (2018.01)
*F24F 11/89* (2018.01)
(Continued)

(52) U.S. Cl.
CPC .............. *F24F 11/30* (2018.01); *F24F 11/52* (2018.01); *F24F 11/58* (2018.01); *F24F 11/64* (2018.01);
(Continued)

(58) Field of Classification Search
CPC .. F24F 11/64; F24F 11/65; F24F 11/89; F24F 11/52; F24F 11/58; G06F 1/24; G06F 13/00
See application file for complete search history.

(56) References Cited

U.S. PATENT DOCUMENTS

2013/0085615 A1*  4/2013  Barker ................... A61G 10/00
                                                              700/277
2013/0245837 A1*  9/2013  Grohman ................. F24F 11/30
                                                              700/276

(Continued)

FOREIGN PATENT DOCUMENTS

| CN | 102739479 A | 10/2012 |
| JP | 2013-029937 A | 2/2013 |
| JP | 2015-148396 A | 8/2015 |

*Primary Examiner* — Ronald D Hartman, Jr.
(74) *Attorney, Agent, or Firm* — Paratus Law Group, PLLC

(57) ABSTRACT

There is provided an information processing device to facilitate an electronic apparatus that affects an environmental condition and an electronic apparatus that measures an environmental condition to collaborate with each other via a network, the information processing device including: a determination unit configured to determine, on a basis of first type information representing an affected condition type of an electronic apparatus that affects at least one of a plurality of environmental conditions and second type information representing a measurement condition type of a measurement apparatus that measures at least one of the plurality of environmental conditions, whether the electronic apparatus is to be set as an apparatus that uses a measurement result from the measurement apparatus as an operation input.

21 Claims, 19 Drawing Sheets

(51) Int. Cl.
*F24F 11/64* (2018.01)
*F24F 11/65* (2018.01)
*F24F 11/52* (2018.01)
*F24F 11/58* (2018.01)
*F24F 140/50* (2018.01)
*G06F 13/00* (2006.01)
*G06F 1/24* (2006.01)

(52) U.S. Cl.
CPC .............. *F24F 11/65* (2018.01); *F24F 11/89* (2018.01); *G06F 1/24* (2013.01); *G06F 13/00* (2013.01); *F24F 2140/50* (2018.01)

(56) References Cited

U.S. PATENT DOCUMENTS

| | | | |
|---|---|---|---|
| 2014/0031989 A1* | 1/2014 | Bergman | F24F 11/62 700/276 |
| 2014/0107846 A1* | 4/2014 | Li | H04W 4/33 700/275 |
| 2014/0277757 A1* | 9/2014 | Wang | F24F 11/30 700/276 |
| 2014/0365017 A1* | 12/2014 | Hanna | F24F 11/30 700/276 |
| 2015/0204551 A1* | 7/2015 | Nair | F24F 11/70 165/217 |
| 2015/0276508 A1* | 10/2015 | Smullin | G06Q 10/10 702/130 |
| 2015/0308706 A1* | 10/2015 | Bunker | G05B 15/02 700/275 |
| 2015/0369505 A1* | 12/2015 | Malve | F24F 11/70 700/276 |
| 2015/0370927 A1* | 12/2015 | Flaherty | F24F 11/30 703/1 |
| 2016/0004237 A1* | 1/2016 | Mohan | G05B 15/02 700/275 |
| 2016/0047565 A1* | 2/2016 | Robinson | G05B 15/00 700/278 |
| 2016/0054017 A1* | 2/2016 | Takahashi | F24F 11/30 700/276 |
| 2016/0069579 A1* | 3/2016 | Yabunouchi | F24F 11/0001 165/11.2 |
| 2016/0209072 A1* | 7/2016 | Golden | H04L 12/2827 |
| 2016/0223395 A1* | 8/2016 | Cohn | H05B 47/125 |
| 2017/0068782 A1* | 3/2017 | Pillai | G06Q 50/16 |
| 2017/0115019 A1* | 4/2017 | Desmet | G05B 15/02 |
| 2017/0123440 A1* | 5/2017 | Mangsuli | F24F 11/62 |
| 2018/0004178 A1* | 1/2018 | Haines | F24F 11/61 |

* cited by examiner

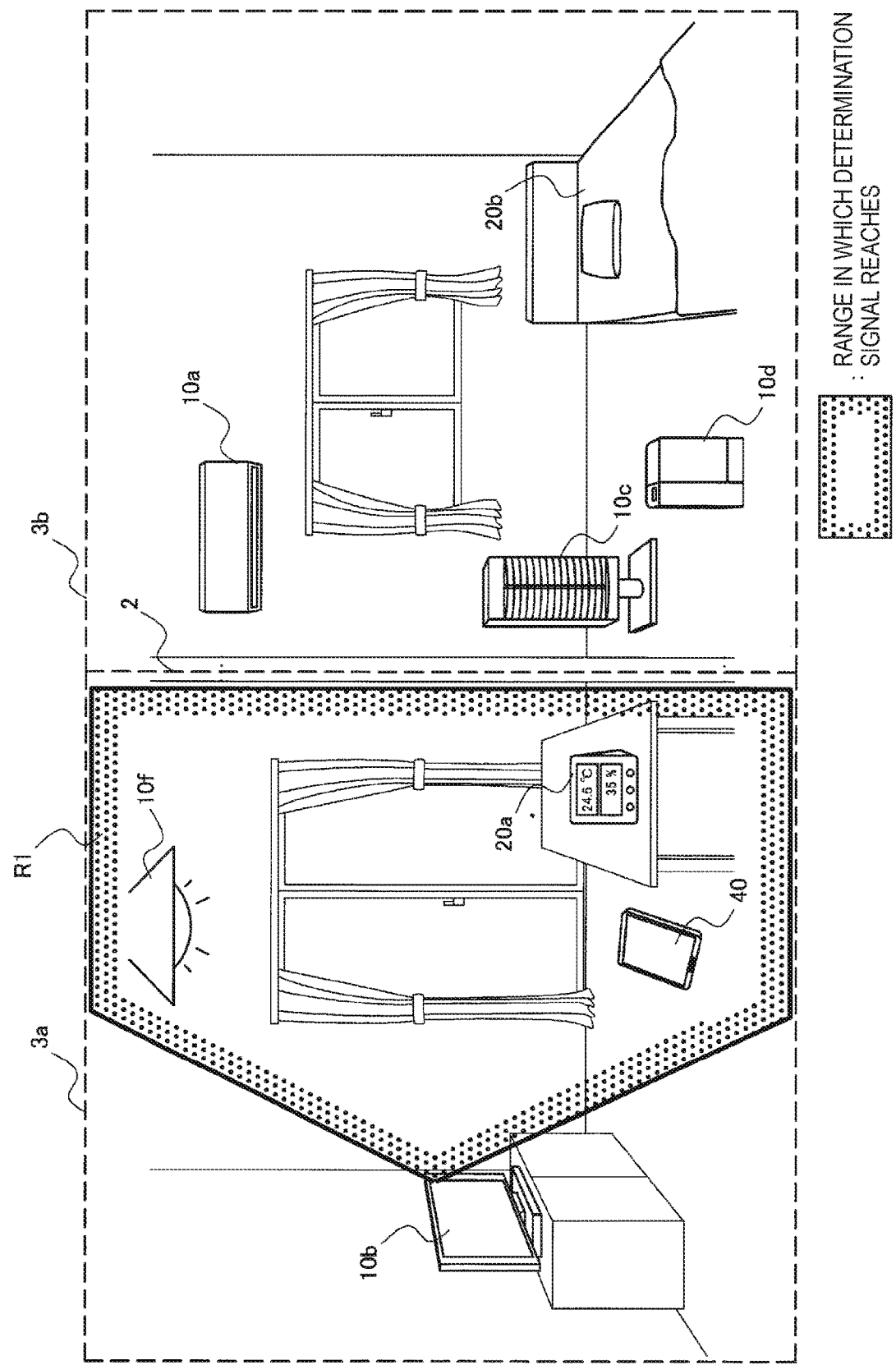

INFORMATION PROCESSING DEVICE, ELECTRONIC APPARATUS, METHOD, AND PROGRAM

CROSS REFERENCE TO PRIOR APPLICATION

This application is a National Stage Patent Application of PCT International Patent Application No. PCT/JP2016/079333 (filed on Oct. 3, 2016) under 35 U.S.C. § 371, which claims priority to Japanese Patent Application No. 2016-001654 (filed on Jan. 7, 2016), which are all hereby incorporated by reference in their entirety.

TECHNICAL FIELD

The present disclosure relates to an information processing device, an electronic apparatus, a method, and a program.

BACKGROUND ART

There are a variety of electronic apparatuses that can affect environmental conditions in environments surrounding end users. For example, an air conditioning apparatus adjusts temperatures of an environment, and a humidifier and a dehumidifier adjust humidity of an environment. Although an air conditioning apparatus directly controls temperatures of an environment, operations of the air conditioning apparatus can secondarily or indirectly affect not only temperatures of an environment but also other conditions such as, for example, humidity of the environment, the volume of environmental sounds, and body temperatures of organisms in the environment.

DISCLOSURE OF INVENTION

Technical Problem

In recent years, it has become relatively easier to form a home network by connecting electronic apparatuses to each other within a home. However, home networks are mainly used for interchange, recording, and reproduction of content, and thus connecting electronic apparatuses that are irrelevant to such uses to home networks has no significance yet. Even if an air conditioning apparatus is connected to a home network, for example, typical control loops of the air conditioning apparatus are closed by sensors and operation units included in the same apparatus (except for when a user gives control signals using a remote controller), and there are virtually no scenarios in which the home network is utilized. Even if a user purchases an individual sensor and installs the sensor in an environment, it may be difficult for the user to construct a mechanism which enables the sensor to collaborate with electronic apparatuses within the environment in a case in which the user has no expertise in electronics.

The technology according to the present disclosure aims to overcome the above-described problem and facilitate a wider variety of electronic apparatuses to collaborate with each other.

Solution to Problem

According to the present disclosure, there is provided an information processing device including: a determination unit configured to determine, on a basis of first type information representing an affected condition type of an electronic apparatus that affects at least one of a plurality of environmental conditions and second type information representing a measurement condition type of a measurement apparatus that measures at least one of the plurality of environmental conditions, whether the electronic apparatus is to be set as an apparatus that uses a measurement result from the measurement apparatus as an operation input.

In addition, according to the present disclosure, there is provided an electronic apparatus including: an operation unit configured to perform an operation that affects at least one of a plurality of environmental conditions; and a control unit configured to set the operation unit to use a measurement result from a measurement apparatus, which measures at least one of the plurality of environmental conditions, as an operation input in accordance with a result of determination based on first type information representing an affected condition type of the operation unit and second type information representing a measurement condition type of the measurement apparatus.

In addition, according to the present disclosure, there is provided an information processing method executed by an information processing device, the information processing method including: acquiring first type information representing an affected condition type of an electronic apparatus that affects at least one of a plurality of environmental conditions; acquiring second type information representing a measurement condition type of a measurement apparatus that measures at least one of the plurality of environmental conditions; and determining whether the electronic apparatus is to be set as an apparatus that uses a measurement result from the measurement apparatus as an operation input on a basis of the first type information and the second type information.

In addition, according to the present disclosure, there is provided an operation method of an electronic apparatus that includes an operation unit configured to perform an operation that affects at least one of a plurality of environmental conditions, the operation method including: setting the operation unit to use a measurement result from a measurement apparatus, which measures at least one of the plurality of environmental conditions, as an operation input in accordance vwith a result of determination based on first type information representing an affected condition type of the operation unit and second type information representing a measurement condition type of the measurement apparatus, and performing the operation using a measurement result from the measurement apparatus as an operation input in accordance with the setting.

In addition, according to the present disclosure, there is provided a program causing a processor of an information processing device to function as: a determination unit configured to determine, on a basis of first type information representing an affected condition type of an electronic apparatus that affects at least one of a plurality of environmental conditions and second type information representing a measurement condition type of a measurement apparatus that measures at least one of the plurality of environmental conditions, whether the electronic apparatus is to be set as an apparatus that uses a measurement result from the measurement apparatus as an operation input.

In addition, according to the present disclosure, there is provided a program causing a processor of an electronic apparatus, which includes an operation unit configured to perform an operation that affects at least one of a plurality of environmental conditions, to function as: a control unit configured to set the operation unit to use a measurement result from a measurement apparatus, which measures at least one of the plurality of environmental conditions, as an operation input in accordance with a result of determination based on first type information representing an affected condition type of the operation unit and second type information representing a measurement condition type of the measurement apparatus.

Advantageous Effects of Invention

According to the technology of the present disclosure, it is easier to construct a novel mechanism that causes electronic apparatuses to collaborate with each other by freely combining an electronic apparatus that affects an environmental condition and an electronic apparatus that measures an environmental condition.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram for describing a third technique for determining environmental commonality.

MODE(S) FOR CARRYING OUT THE INVENTION

Figure 1:
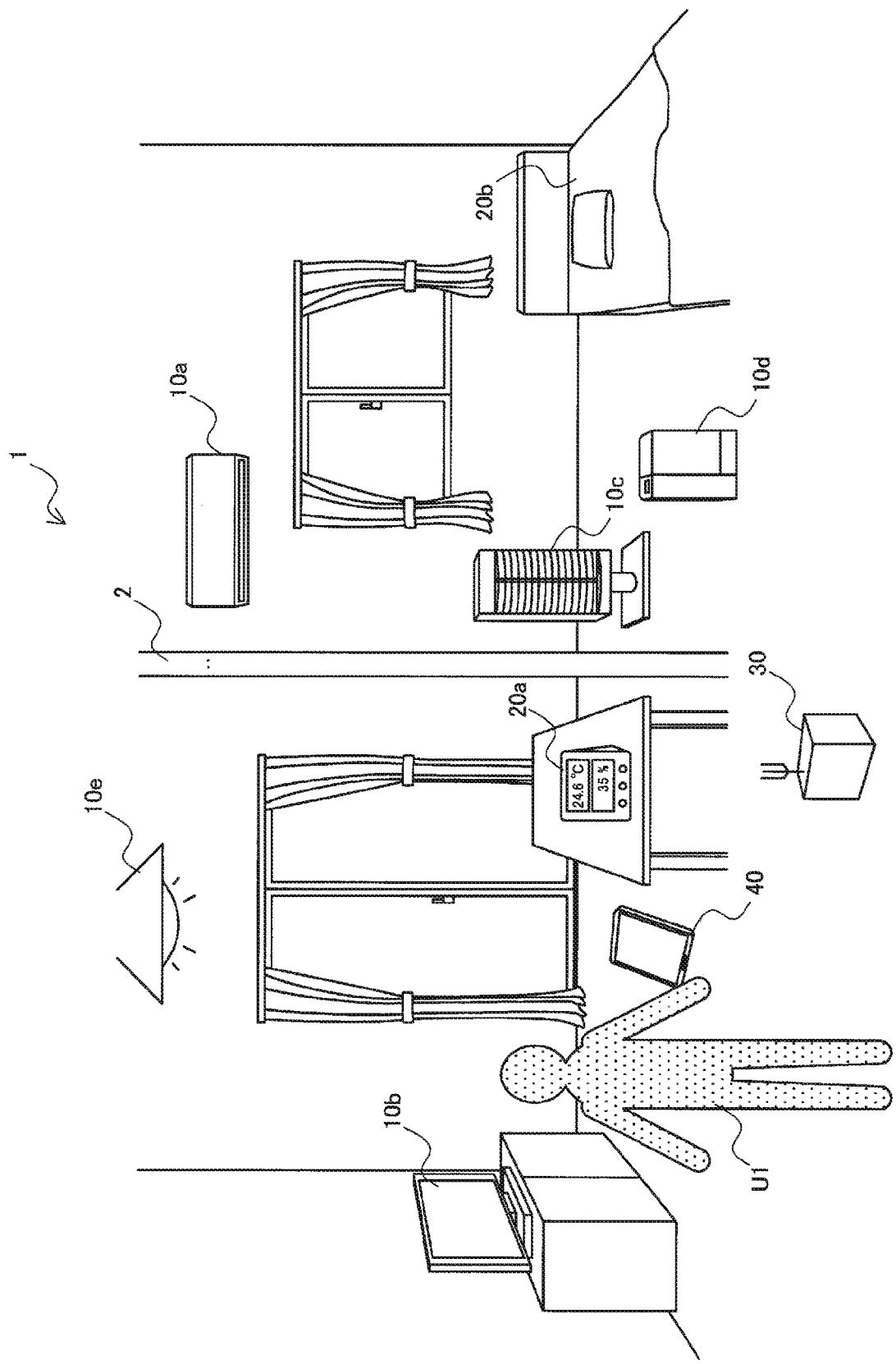
FIG. 1 is an explanatory diagram for describing an example of an environment in which a network system according to the present disclosure can be used.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.

1. System Overview
1-1. Example of assumed environment
1-2. Description of problem
1-3. Introduction of organizer
2. Configuration example of organizer
2-1. Basic configuration
2-2. Determination of environmental commonality
3. Configuration example of electronic apparatus/measurement apparatus
4. Flow of processing
4-1. Processing of organizer
4-2. Processing of electronic apparatus
4-3. Processing of measurement apparatus
5. Conclusion 1. System Overview

[1-1. Example of Assumed Environment]

FIG. 1 is an explanatory diagram for describing an example of an environment in which a network system according to the present disclosure can be used. An environment 1 corresponds to a living space of a user U1. Referring to FIG. 1, electronic apparatuses 10a, 10b, 10c, 10d, and 10e are present in the environment 1. The electronic apparatus 10a is an air conditioning apparatus that adjusts temperatures of the environment 1. The electronic apparatus 10b is a television apparatus that receives and reproduces television broadcasts. The electronic apparatus 10c is a heating apparatus that radiates heat. The electronic apparatus 10d is a humidifier that discharges moisture. The electronic apparatus 10e is an interior light that emits illumination light.

These electronic apparatuses affect at least one of a plurality of environmental conditions such as temperature, environmental sound volume, environmental illuminance, and humidity. Each of the electronic apparatuses operates according to operations by a user or operates autonomously. As an example of autonomous operations, an electronic apparatus can use a feedback loop for getting a measured value of any environmental condition close to a target value (e.g., Proportional-Integral-Derivative (PID) control). As another example, an electronic apparatus can shift between different operation states or change an operation level on the basis of a measured value of an environmental condition. As still another example, an electronic apparatus can be switched on or switched off on the basis of comparison of a measured value and a threshold value of an environmental condition. In all cases, any environmental condition serves as operation inputs of the electronic apparatuses. In general, an electronic apparatus that needs to measure an environmental condition as an operation input includes a sensor that performs the measurement. For example, the air conditioning apparatus 10a has a temperature sensor that measures temperatures, and can operate to bring a measured temperature to be close to a target value. The television apparatus 10b has an illuminance sensor that measures environmental illuminance and can adjust luminance of a screen depending on measured illuminance.

Measurement apparatuses 20a and 20b are additionally present in the environment 1. In the present specification, a measurement apparatus refers to an electronic apparatus playing a role of measuring one or more environmental conditions. The measurement apparatus 20a is a temperature sensor that measures temperatures of the environment 1. The measurement apparatus 20b is a sensing bed that measures biometric indicators (e.g., a pulse rate, a respiratory rate, and the like) of a human lying on the bed. Here, an environmental condition includes at least one of a non-biological condition and a biological condition. That is, a biological condition represented by a biometric indicator is also a type of environmental condition.

Any type of electronic apparatus and measurement apparatus may be present in the environment 1, without being limited to the example of FIG. 1. In a case in which it is not necessary to distinguish the electronic apparatuses 10a to 10e in the following description, the electronic apparatuses can be collectively referred to as electronic apparatuses 10 by omitting the letters affixed to the reference numerals. The omission of letters affixed to reference numerals can also be applied to other constituent elements (e.g., the measurement apparatuses 20a and 20b can also be referred to as measurement apparatuses 20).

The network system according to the present disclosure can be used in such an environment in which one or more electronic apparatuses 10 and one or more measurement apparatuses 20 are present. Although the living space of the user is exemplified as an example of an environment in FIG. 1, the network system according to the present disclosure may be used in any other environment such as a passenger car or another type of vehicle, an office, a shop, an education facility, or a public facility.

FIG. 1 also illustrates a communication apparatus 30 and an information terminal 40. The communication apparatus 30 relays communication between one or more electronic apparatuses 10 and one or more measurement apparatuses 20. The communication apparatus 30 may be any type of communication apparatus, for example, a wireless local area network (LAN) access point, a router, a LAN switch, or the like. In a case in which direct communication between the apparatuses (e.g., via an ad hoc network or a connection line) is performed, the communication apparatus 30 may not be present.

The information terminal 40 is a terminal device that can be used by the user U1 to access the network system. Although a tablet personal computer (PC) is illustrated as an example of the information terminal 40 in FIG. 1, another type of terminal device such as a desktop PC, a laptop PC, a smartphone, a game terminal, a car navigation equipment, a head-mount display, or a smart watch may be used. The information terminal 40 may be an electronic apparatus that affects one or more environmental conditions by itself, or may have a sensor that measures one or more environmental conditions (i.e., the information terminal may itself be a measurement apparatus).

[1-2. Description of Problem]

Various electronic apparatuses are present in an environment surrounding a user, like the environment 1 illustrated in FIG. 1. In recent years, it has become relatively easier to form a home network by connecting electronic apparatuses within a home. However, control over environmental conditions by an electronic apparatus is still performed in a stand-alone manner in most cases, and there are virtually no scenarios in which such a home network is utilized to control an environmental condition. In the example of FIG. 1, the unique temperature sensor mounted in the air conditioning apparatus 10a in advance measures temperatures, and the air conditioning apparatus 10a uses measurement results thereof as operation inputs. Meanwhile, the temperature sensor 20a can also measure temperatures of the environment 1. However, expertise in electronic apparatuses is required to set the air conditioning apparatus 10a so that measurement results output from the temperature sensor 20a can be used as operation inputs, and thus it is not easy for ordinary users.

[1-3. Introduction of Organizer]

Internet of Everything (IoT) is a concept aimed at providing a more sophisticated value by networking not only information terminals such as computers but also various apparatuses to cause a plurality of apparatuses collaborate with each other. The technology according to the present disclosure aims to cause an end user with no advanced expertise readily enjoy IoT in controlling environmental conditions. More specifically, a function of automatically or semi-automatically forming mapping between electronic apparatuses affecting environmental conditions and measurement apparatuses providing operation inputs for the electronic apparatuses will be introduced in an embodiment. In the present specification, a module providing the mapping function will be referred to as an "organizer." Network connection on a foundation of cooperation of apparatuses may be constructed using any wireless communication protocol or wired communication protocol. An organizer forms a meaningful pair or group of a measurement apparatus that provides operation inputs and an electronic apparatus that receives the operation inputs on such a foundation and sets operations of the electronic apparatus in accordance with the formation.

Figure 2:
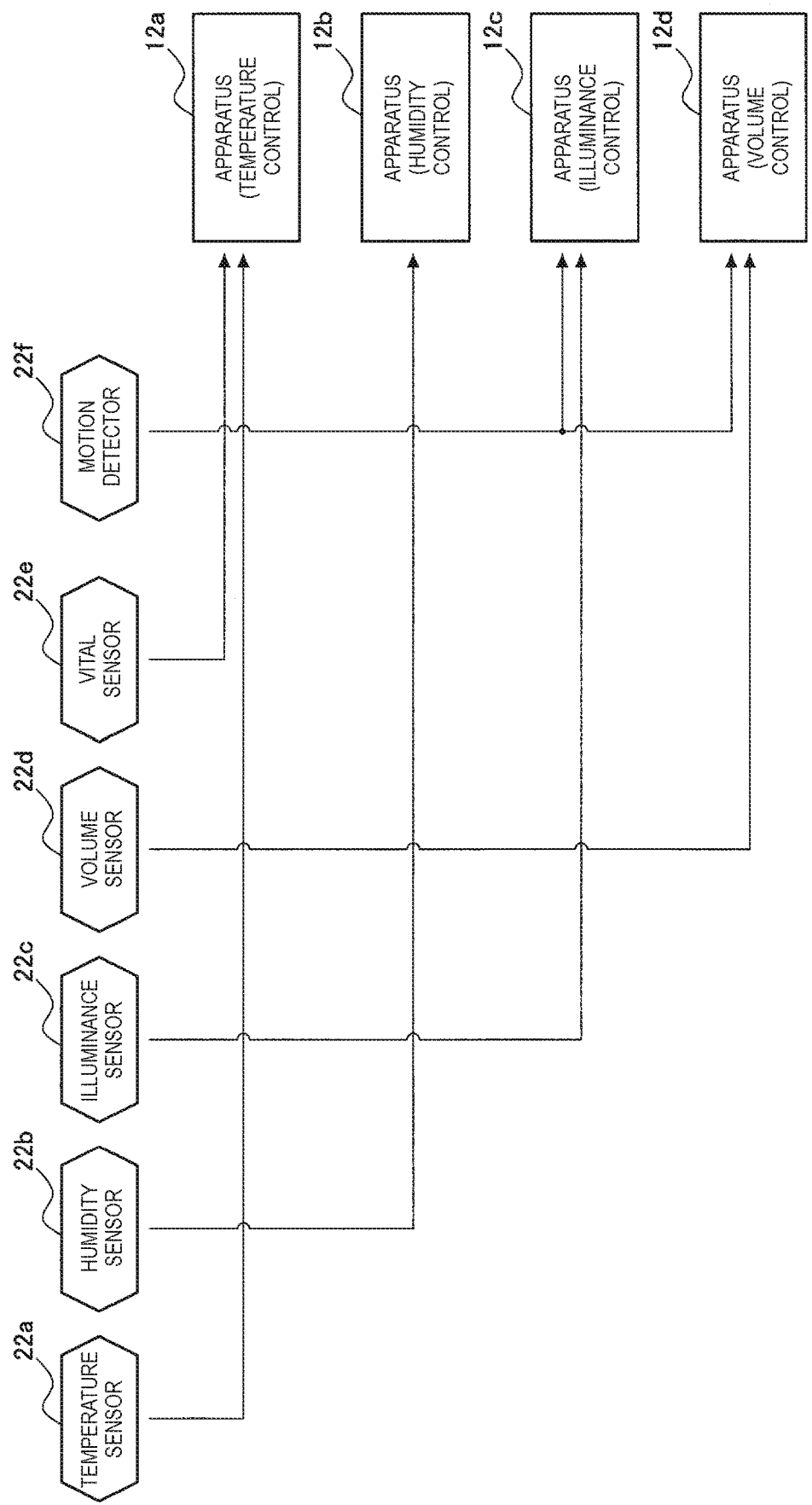
FIG. 2 is an explanatory diagram for describing an overview of mapping between a measurement apparatus and an electronic apparatus.

FIG. 2 is an explanatory diagram for describing an overview of mapping between measurement apparatuses and electronic apparatuses. As examples of probable measurement apparatuses, a temperature sensor 22a, a humidity sensor 22b, an illuminance sensor 22c, a volume sensor 22d, a vital sensor 22e, and a motion detector 22f are exemplified on the upper side of FIG. 2. As examples of probable electronic apparatuses, an apparatus 12a that affects environmental temperatures, an apparatus 12b that affects environmental humidity, an apparatus 12c that affects environmental illuminance, and an apparatus 12d that affects environmental sound volume are shown on the right end of FIG. 2.

A role of an organizer is to determine, in a case in which the presence of these apparatuses within an environment is detected, which combination of a measurement apparatus that provides an operation input and an electronic apparatus that receives the operation input is most meaningful. For example, the apparatus 12a that affects environmental temperatures can receive a temperature measured by the temperature sensor 22a as an operation input. The apparatus 12b that affects environmental humidity can receive humidity measured by the humidity sensor 22b as an operation input. The apparatus 12c that affects environmental illuminance can receive illuminance measured by the illuminance sensor 22c as an operation input. The apparatus 12d that affects environmental sound volume can receive volume measured by the volume sensor 22d as an operation input. These are cases in which the measurement apparatuses and the electronic apparatuses deal with common environmental conditions.

In addition, even if environmental conditions of the sensors and the apparatuses are different, there is a possibility of mapping being significantly established in a case in which a correlation between the different environmental conditions can be defined. For example, in a case in which the apparatus 12a, 12b, 12c, or 12d is switched on only when a user is present within the environment, a correlation between a measurement result of the motion detector 22f detecting the presence of the user and the operation of the apparatus 12a. 12b, 12c, or 12d can be discovered. In addition, if an environmental temperature affects biometric indices (e.g., a pulse rate, a respiratory rate, and the like), a correlation between a measurement result of the vital sensor 22e measuring the biometric indices and the apparatus 12a affecting the environmental temperature can be discovered. Such correlations (including common relations) are represented by arrows in FIG. 2.

According to an embodiment, information defining the type of environmental condition affected by electronic apparatuses is provided to the individual electronic apparatuses. Such information will be referred to as affected condition type information in the present specification. In addition, information defining the type of environmental condition to be measured by measurement apparatuses is provided to the individual measurement apparatuses. Such information will be referred to as measurement condition type information in the present specification. Affected condition type information or measurement condition type information is typically provided from a discovered apparatus (or from a database accumulating apparatus information) to an organizer as a part of apparatus information after the organizer discovers the apparatus on a network. The organizer determines how mapping between different apparatuses should be formed on the basis of comparison of the affected condition type information and the measurement condition type information.

FIG. 3A to FIG. 3D each illustrate an example of disposition of an organizer. In a first example illustrated in FIG. 3A, an organizer 100a is integrally installed in the electronic apparatus 10a (e.g., installed using a processor and a memory mounted in the electronic apparatus 10a). The organizer 100a discovers, for example, a measurement apparatus (e.g., the measurement apparatus 20a) that can provide measurement results as operation inputs of the electronic apparatus 10a, and sets the electronic apparatus 10a to use the measurement results from the discovered measurement apparatus as operation inputs.

Figure 3A:
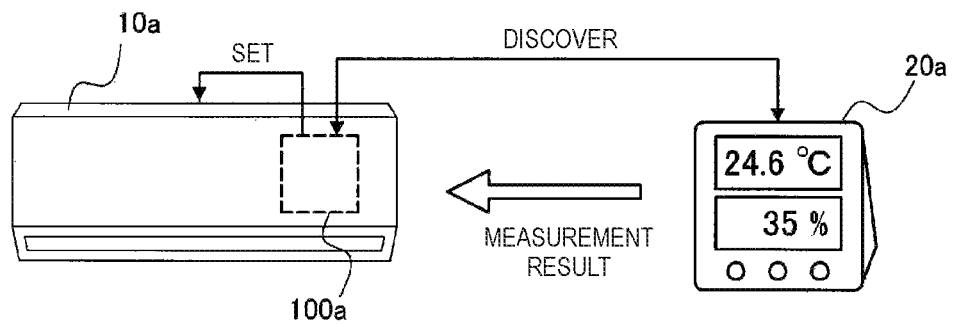
FIG. 3A is an explanatory diagram for describing a first example of a disposition of an organizer.
Figure 3B:
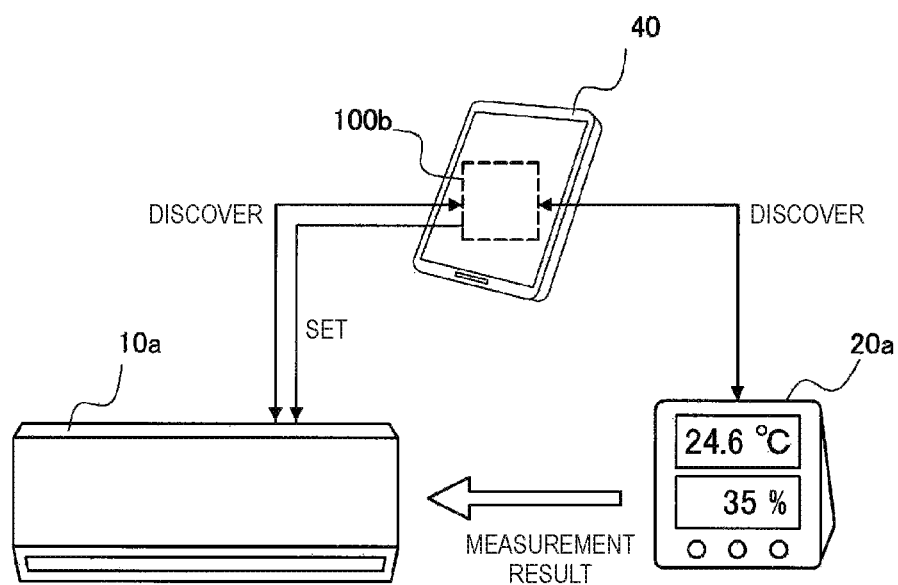
FIG. 3B is an explanatory diagram for describing a second example of a disposition of an organizer.

In a second example illustrated in FIG. 3B, an organizer 100b is installed in the information terminal 40 that is a different device from the electronic apparatus 10a and the measurement apparatus 20a. The organizer 100b discovers, for example, the electronic apparatus 10a and the measurement apparatus 20a, and further determines whether a measurement result from the measurement apparatus 20a can be used by the electronic apparatus 10a as an operation input. Then, the organizer 100b sets the electronic apparatus 10a in accordance with the determination result.

Figure 3C:
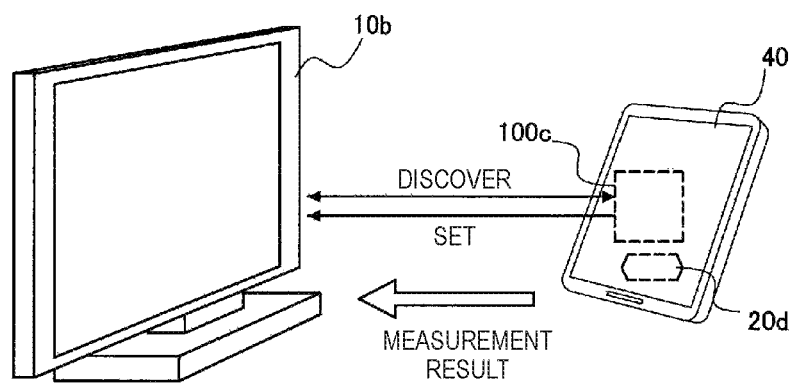
FIG. 3C is an explanatory diagram for describing a third example of a disposition of an organizer.

In a third example illustrated in FIG. 3C, an organizer 100c is installed in the information terminal 40 (e.g., installed using a processor and a memory mounted in the information terminal 40), and the information terminal 40 further has a measurement function 20d. The organizer 100c discovers, for example, the electronic apparatus 10b that can use measurement results output from the measurement function 20d as operation inputs and sets the electronic apparatus 10b to use the measurement results output from the measurement function 20d as operation inputs.

Figure 3D:
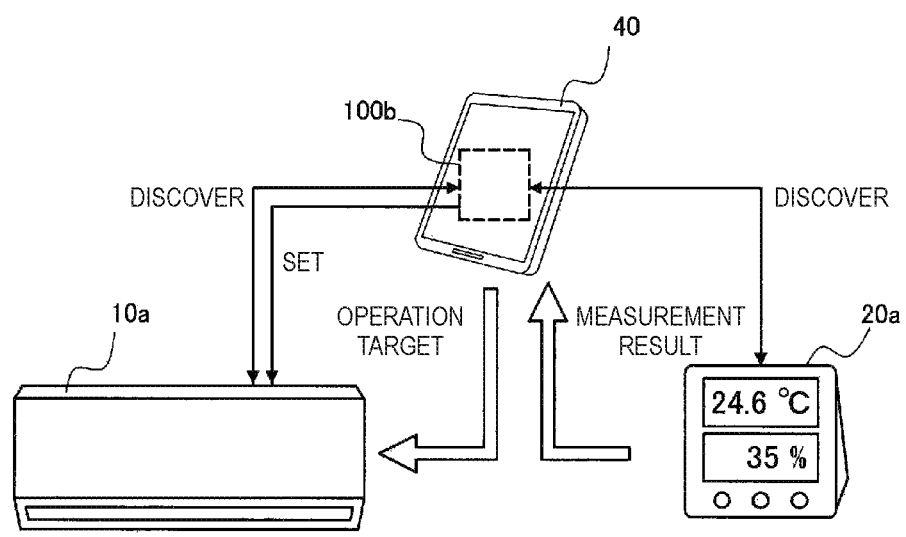
FIG. 3D is an explanatory diagram for describing a fourth example of a disposition of an organizer.

In a fourth example illustrated in FIG. 3D, the organizer 100b is installed in the information terminal 40 that is a different device from the electronic apparatus 10a and the measurement apparatus 20a as in the second example. Here, after the organizer 100b sets the electronic apparatus 10a, the organizer 100b relays a measurement result output from the measurement apparatus 20a to the electronic apparatus 10a via a communication interface, which is not illustrated. The organizer 100b may perform any type of transformation on the information (e.g., conversion into an operation target, or the like), instead of relaying the measurement result with no change.

As described above, an organizer may be installed in an arbitrary node that can communicate with an apparatus disposed within an environment. In addition, information exchanges between an organizer and an apparatus and information exchanges between apparatuses may be performed via any route. Examples of more detailed configurations of such an organizer, electronic apparatuses, and measurement apparatuses will be described in detail starting with the next section.

2. Configuration Example of Organizer

[2-1. Basic Configuration]

Figure 4:
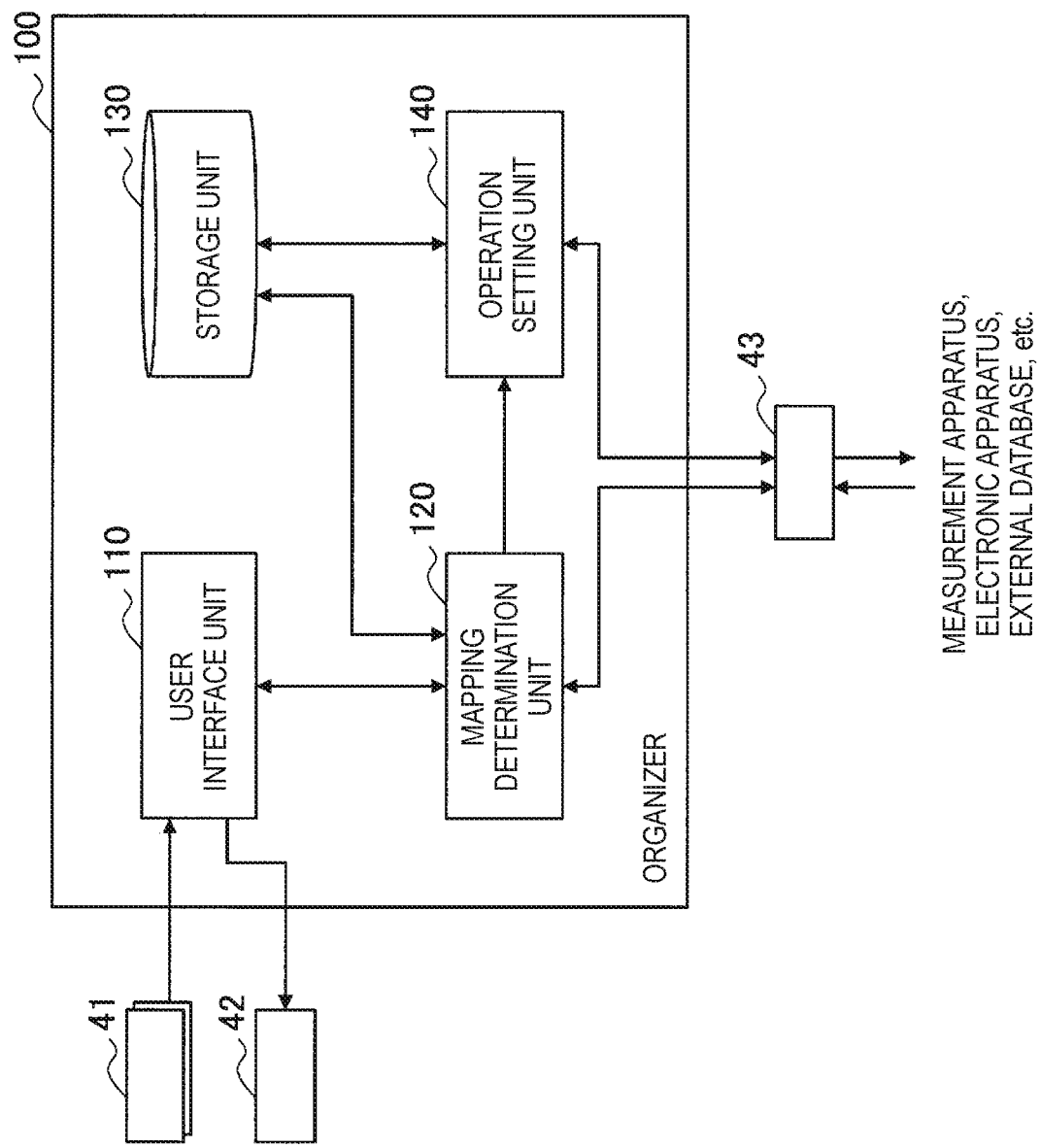
FIG. 4 is a block diagram illustrating an example of a configuration of logical functions of an organizer according to an embodiment.

FIG. 4 is a block diagram illustrating an example of a configuration of logical functions of an organizer 100 according to an embodiment. The organizer 100 includes a user interface unit 110, a mapping determination unit 120, a storage unit 130, and an operation setting unit 140. According to the example of FIG. 4, the user interface unit 110 is connected to one or more input interfaces 41 and a display device 42. The mapping determination unit 120 is connected to a communication interface 43. The operation setting unit 140 is also connected to the communication interface 43.

The user interface unit 110 has a role of executing interaction of the organizer 100 with a user. The user interface unit 110, for example, detects a user input via the input interfaces 41 and outputs a user input signal to the mapping determination unit 120. The input interfaces 41 may include any type of input means such as a touch sensor, a keyboard, a keypad, a button, a switch, a camera, a microphone, a positioning sensor, a vibration sensor, or an attitude sensor. The user interface unit 110 may recognize voice commands as user inputs using a voice recognition technology or recognize gesture commands from captured images. In addition, the user interface unit 110 may cause the display device 42 to display graphical user interface (GUI) images. The display device 42 may be, for example, a projector, a monitor, or the like. GUI images can be used by the mapping determination unit 120, for example, to obtain confirmations from a user on mapping between the electronic apparatuses and the measurement apparatuses. The user interface unit 110 may output voice notifications via a speaker instead of (or in addition to) GUI images.

The mapping determination unit 120 determines mapping between the electronic apparatuses 10 and the measurement apparatuses 20 on the basis of the affected condition type information representing an affected condition type of the electronic apparatuses 10 and the measurement condition type information representing a measurement condition type of the measurement apparatuses 20.

More specifically, the mapping determination unit 120 monitors the network on which the apparatuses within the environment 1 are connected and waits for connection of a new apparatus to the network. Then, upon discovering a new apparatus, the mapping determination unit 120 acquires apparatus information of the discovered new apparatus from the apparatus or an external database. The discovery of the new apparatus may be performed by, for example, receiving a connection notification message sent from the new apparatus on the network via the communication interface 43. Instead, the discovery of the new apparatus may be performed by broadcasting an apparatus search message via the communication interface 43 and receiving a search response message with which the new apparatus replies as a response to the apparatus search message. The apparatus information of the new apparatus may be included in, for example, the connection notification message or the search response message. Instead, the apparatus information of the new apparatus may be acquired by the mapping determination unit 120 accessing any database using access information (e.g., a Uniform Resource Locator (URL)) described in the messages. The above-described procedure may be implemented using a protocol such as, for example, Simple Service Discovery Protocol (SSDP) or Universal Plug and Play (UPnP).

Upon discovering an electronic apparatus 10 affecting at least one environmental condition, for example, the mapping determination unit 120 receives apparatus information including affected condition type information of the discovered apparatus 10 via the communication interface 43. Then, the mapping determination unit 120 can determine whether a new electronic apparatus 10 is to be set to use a measurement result from any measurement apparatus 20 as an operation input on the basis of the affected condition type information of the discovered electronic apparatus 10 and measurement condition type information of one or more measurement apparatuses 20 on the network. In addition, upon discovering a measurement apparatus 20 measuring at least one environmental condition, the mapping determination unit 120 receives apparatus information including measurement condition type information of the discovered apparatus 20 via the communication interface 43. Then, the mapping determination unit 120 can determine whether any of the electronic apparatuses 10 is to be set to use a measurement result from the new measurement apparatus 20 as an operation input on the basis of the measurement condition type information of the measurement apparatus 20 and affected condition type information of one or more electronic apparatuses 10 on the network. The above-described mapping determination may be performed not only when a new apparatus is discovered but also when withdrawal of an existing apparatus from the network is detected or when the user instructs a change of the mapping.

In the present embodiment, in a case in which measurement condition type information of a certain measurement apparatus 20 represents a measurement condition type correlating with an affected condition type represented by affected condition type information of a certain electronic apparatus 10, the mapping determination unit 120 determines to set the electronic apparatus 10 as an apparatus using a measurement result from the measurement apparatus 20 as an operation input. As an example, in a case in which an affected condition type matches a measurement condition type, the affected condition type and measurement condition type can be determined to correlate with each other.

Figure 5A:
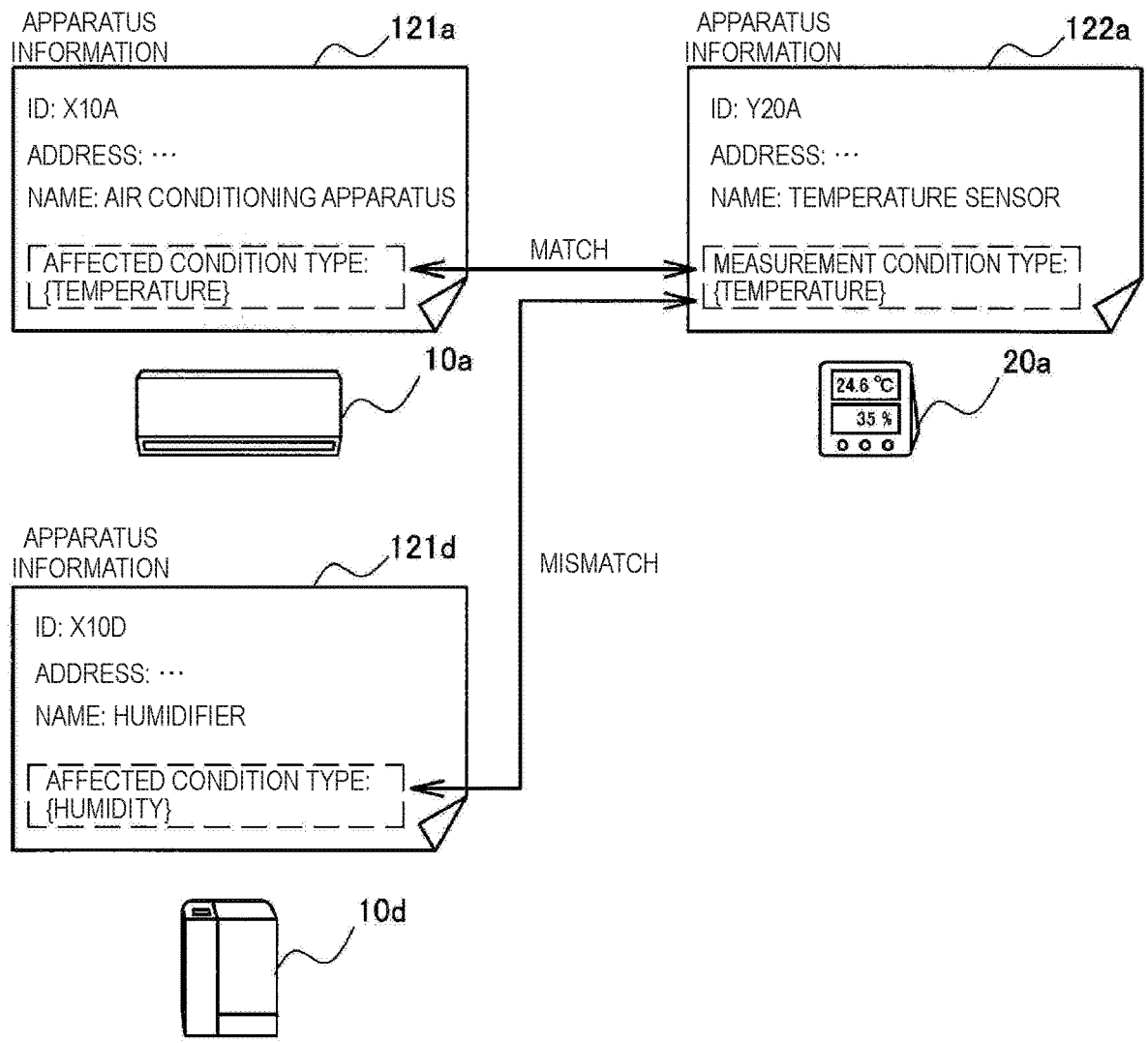
FIG. 5A is a first explanatory diagram for describing a first technique for mapping determination.

FIG. 5A is a first explanatory diagram for describing a first technique for mapping determination. Referring to FIG. 5A, apparatus information 121a of the electronic apparatus 10a, apparatus information 121d of the electronic apparatus 10d, and apparatus information 122a of the measurement apparatus 20a are illustrated. Here, it is assumed that the measurement apparatus 20a is newly discovered by the organizer 100. The apparatus information 121a includes an identifier (ID) for identifying the electronic apparatus 10a, an address to be used for communication with the electronic apparatus 10a (e.g., an IP address or a MAC address), and the name and affected condition type information of the electronic apparatus 10a. The affected condition type information included in the apparatus information 121a represents that the affected condition type is "temperature." The apparatus information 121d includes an identifier for identifying the electronic apparatus 10d, an address to be used for communication with the electronic apparatus 10d, and the name and affected condition type information of the electronic apparatus 10d. The affected condition type information included in the apparatus information 121d represents that the affected condition type is "humidity." The apparatus information 122a includes an identifier for identifying the measurement apparatus 20a, an address to be used for communication with the measurement apparatus 20a, and the name and measurement condition type information of the measurement apparatus 20a. The measurement condition type information included in the apparatus information 122a represents that the measurement condition type is "temperature."

In the example of FIG. 5A, since the affected condition type represented by the affected condition type information of the apparatus information 121a matches the measurement condition type represented by the measurement condition type information of the apparatus information 122a, the mapping determination unit 120 can determine to set the electronic apparatus 10a as an apparatus that will use measurement results from the measurement apparatus 20a as operation inputs. Meanwhile, since the affected condition type represented by the affected condition type information of the apparatus information 121d does not match the measurement condition type represented by the measurement condition type information of the apparatus information 122a, the mapping determination unit 120 can determine that the electronic apparatus 10d will not receive measurement results from the measurement apparatus 20a as operation inputs.

Figure 5B:
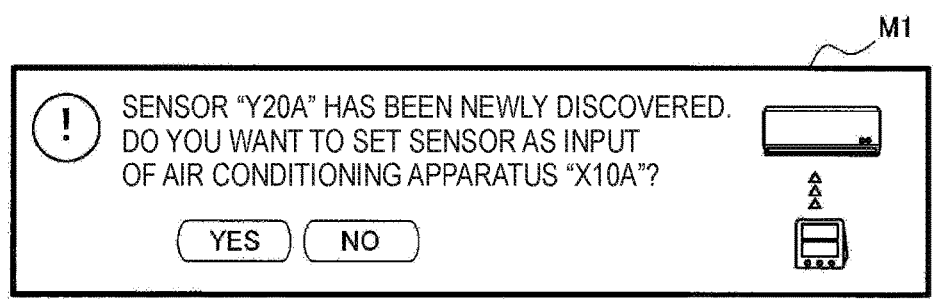
FIG. 5B is an explanatory diagram for describing an example of a user confirmation message related to FIG. 5A.

Before setting the electronic apparatus 10a to use measurement results from the measurement apparatus 20a as operation inputs in accordance with the above-described determination, the mapping determination unit 120 may obtain a confirmation for the above-described setting from the user via the user interface unit 110. FIG. 5B is an explanatory diagram for describing an example of a user confirmation message related to FIG. 5A. A message M1 illustrated in FIG. 5B is for notifying the user of the fact that the measurement apparatus 20a (a sensor "Y20A") has been newly discovered and further inquiring of the user whether the measurement apparatus 20a is to be set as an input of the electronic apparatus 10a (an air conditioning apparatus "X10A"). The user can approve new mapping by, for example, touching a "YES" button displayed with the message M1. When new mapping is approved, the mapping determination unit 120 instructs the operation setting unit 140 to set the electronic apparatus 10a in accordance with the new mapping. The user may reject new mapping by touching a "NO" button displayed with the message M1. In this case, the existing setting of the electronic apparatus 10a (e.g., acquiring an operation input from a sensor built in the electronic apparatus 10a, or the like) is maintained.

Figure 6A:
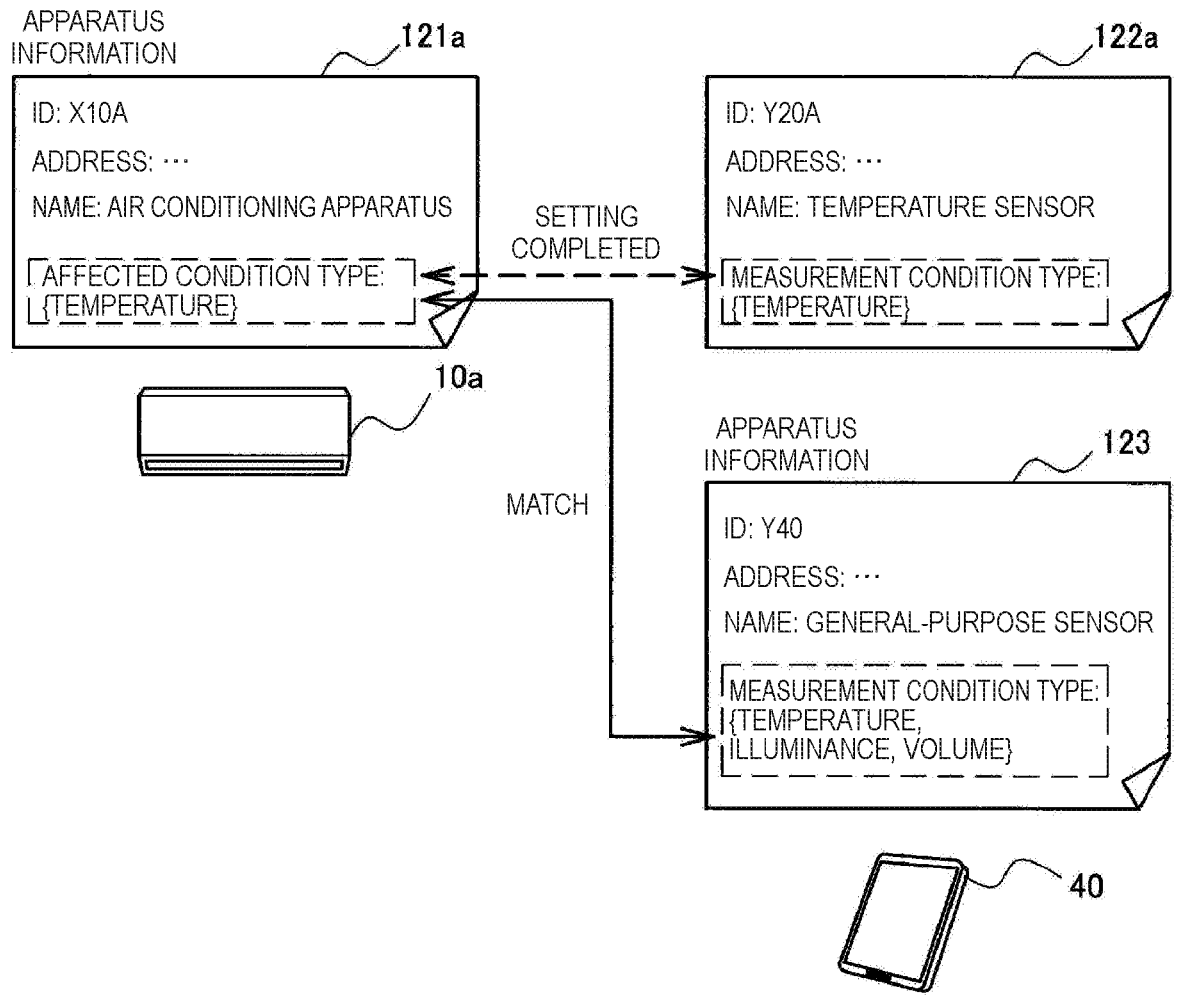
FIG. 6A is a second explanatory diagram for describing the first technique for mapping determination.

FIG. 6A is a second explanatory diagram for describing the first technique for mapping determination. Here, it is assumed that the electronic apparatus 10a is already set to use measurement results from the measurement apparatus 20a as operation inputs and the information terminal 40 with a measurement function is newly discovered. Referring to FIG. 6A, the apparatus information 121a of the electronic apparatus 10a, the apparatus information 122a of the measurement apparatus 20a, and an apparatus information 123 of a measurement apparatus (the information terminal) 40 are illustrated. The apparatus information 123 includes an identifier for identifying the measurement apparatus 40, an address to be used for communication with the measurement apparatus 40, and the name and measurement condition type information of the measurement apparatus 40. The measurement condition type information included in the apparatus information 123 represents that the measurement condition types are "temperature," "illuminance," and "volume."

In the example of FIG. 6A, since the affected condition type "temperature" represented by the affected condition type information of the apparatus information 121a matches one of the measurement condition types represented by the measurement condition type information of the apparatus information 123, the mapping determination unit 120 can determine to set the electronic apparatus 10a as an apparatus that will use measurement results of "temperature" from the measurement apparatus 40 as operation inputs.

Figure 6B:
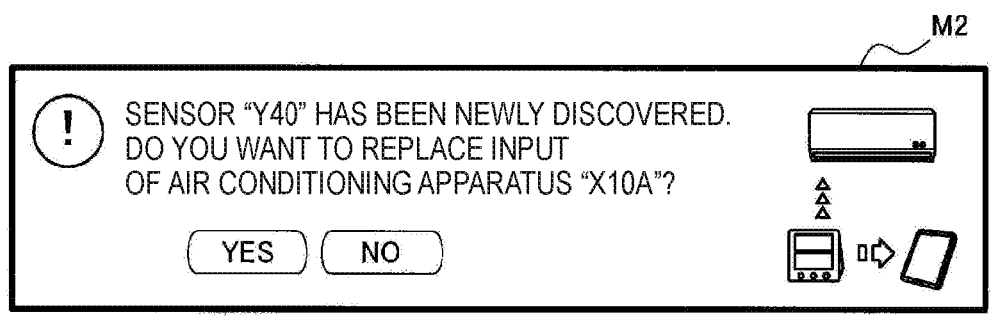
FIG. 6B is an explanatory diagram for describing an example of a user confirmation message related to FIG. 6A.

Before setting the electronic apparatus 10a to use the measurement results from the measurement apparatus 40 as operation inputs in accordance with the above-described determination, the mapping determination unit 120 may obtain a confirmation for the above-described setting from the user interface unit 110. FIG. 6B is an explanatory diagram for describing an example of a user confirmation message related to FIG. 6A. A message M2 illustrated in FIG. 6B is for notifying the user of the fact that the measurement apparatus 40 (a sensor "Y40") has been newly discovered and further inquiring of the user whether the measurement apparatus 40 is to be set as an input of the electronic apparatus 10a (the air conditioning apparatus "X10A"). The user can approve replacement of existing mapping between the electronic apparatus 10a and the measurement apparatus 20a with new mapping between the electronic apparatus 10a and the measurement apparatus 40 by, for example, touching a "YES" button displayed with the message M2. When the replacement of a mapping is approved, the mapping determination unit 120 instructs the operation setting unit 140 to set the electronic apparatus 10a in accordance with the new mapping. The user may reject the replacement of the mapping by touching a "NO" button displayed with the message M2.

In a case in which a plurality of measurement apparatuses can be mapped to one electronic apparatus 10, the mapping determination unit 120 may select any one measurement apparatus and map the selected measurement apparatus to the electronic apparatus 10 as illustrated in FIG. 6A. Instead, the mapping determination unit 120 may map the plurality of measurement apparatuses to the one electronic apparatus 10. For example, the air conditioning apparatus 10a can acquire measured values from a plurality of temperature sensors as operation inputs and operate such that an average of the measured values (or a maximum value, a minimum value, or the like) becomes close to a target value. As another example, the interior light 10e can acquire measured values from a plurality of motion detectors as operation inputs and can be turned on in a case in which one or more of the measured values indicate "true" (detection of a human), or can be turned off in a case in which all the measured values indicate "false" (no detection of a human). Such intermediate processing with respect to the measured values (e.g., an average calculation, an OR operation, or the like) may be executed by the electronic apparatus 10 in a case in which the electronic apparatus 10 has a corresponding capability, or may be executed by the organizer 100 in a case in which the electronic apparatus 10 does not have such a capability. Different target values may be allocated to outputs from the plurality of measurement apparatuses. The mapping determination unit 120 may cause the user to select one or more measurement apparatuses among a plurality of discovered measurement apparatuses to be mapped to the individual electronic apparatuses 10 via the user interface unit 110.

Figure 7:
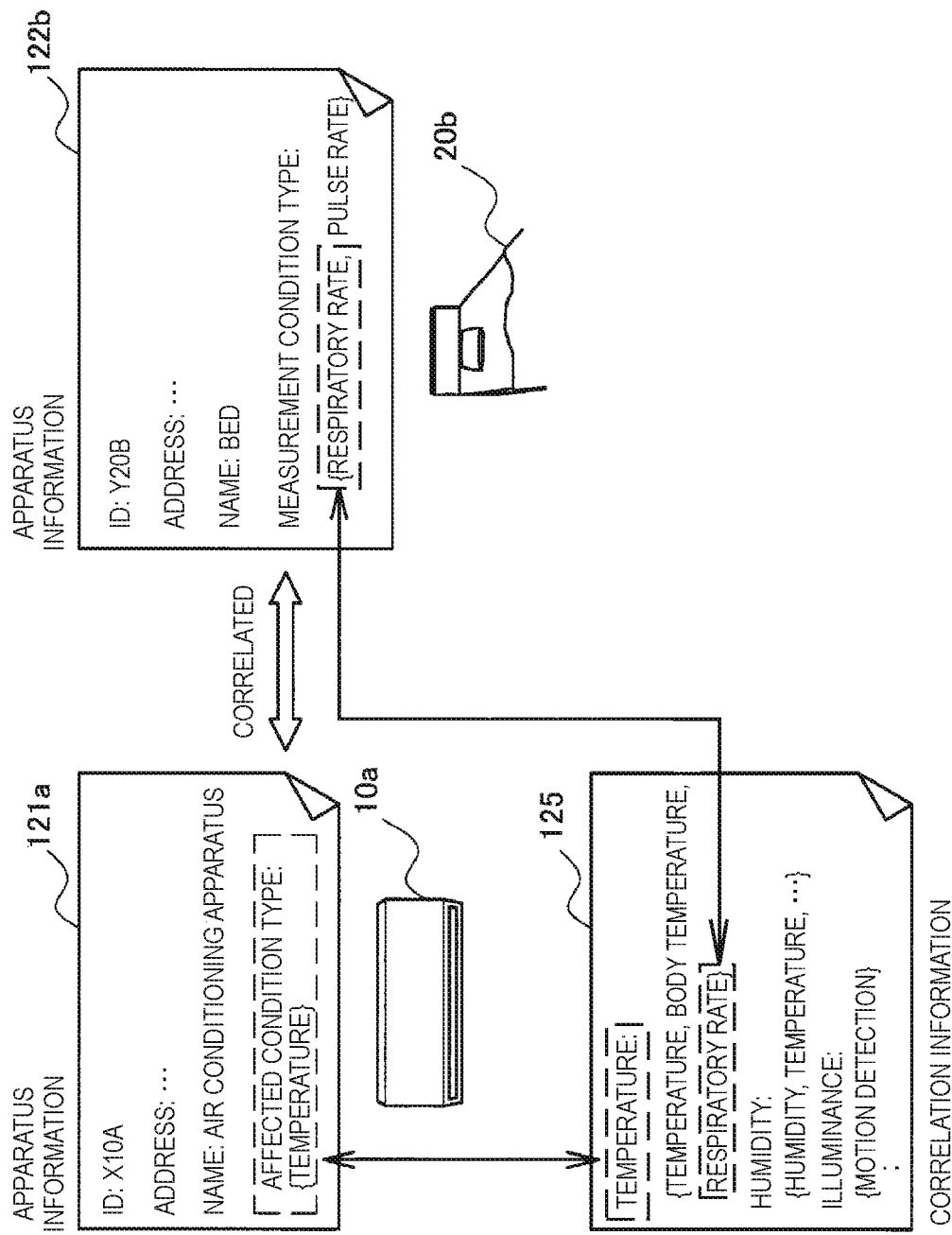
FIG. 7 is an explanatory diagram for describing a second technique for mapping determination.

The mapping determination unit 120 may determine a correlation between an affected condition type and a measurement condition type in accordance with correlation information that can be defined in advance. FIG. 7 is an explanatory diagram for describing a second technique for mapping determination. Referring to FIG. 7, the apparatus information 121a of the electronic apparatus 10a, apparatus information 122b of the measurement apparatus 20b, and correlation information 125 are illustrated. Here, it is assumed that the measurement apparatus 20b is newly discovered by the organizer 100. The apparatus information 122b includes an identifier for identifying the measurement apparatus 20b, an address to be used for communication with the measurement apparatus 20b, and the name and measurement condition type information of the measurement apparatus 20b. The measurement condition type information included in the apparatus information 122b represents that the measurement condition type is a "respiratory rate" and a "pulse rate." The correlation information 125 includes entries of each of a plurality of affected condition types, and each of the entries exemplifies one or more measurement condition types correlating with corresponding affected condition types. For example, the affected condition type "temperature" correlates with the measurement condition types "temperature," "body temperature," and "respiratory rate." The affected condition type "humidity" correlates with the measurement condition types "humidity," "temperature," and the like.

In the example of FIG. 7, among the entries included in the correlation information 125 with regard to the affected condition types represented by the affected condition type information of the electronic apparatus 10a. "respiratory rate" that is one of the measurement condition types represented by the measurement condition type information of the apparatus information 122b is included. Thus, the mapping determination unit 120 can map the measurement apparatus 20b to the electronic apparatus 10a and determine to set the electronic apparatus 10a as an apparatus that will use measurement results (of the "respiratory rate") from the measurement apparatus 20b as operation inputs. Also in this case, the mapping determination unit 120 may instruct the setting to the operation setting unit 140 after approval is obtained from the user via the user interface unit 110, or automatically instruct the setting without approval from the user.

The mapping determination unit 120 may acquire the correlation information 125 from a database accumulating correlation information of a plurality of environmental conditions. Instead, an electronic apparatus 10 may store correlation information related to its own affected condition type in advance, and when the electronic apparatus 10 is discovered, for example, the correlation information of the discovered electronic apparatus 10 may be provided from the electronic apparatus 10 to the organizer 100.

The storage unit 130 stores various kinds of data necessary for the organizer 100 to set the electronic apparatuses 10 and the measurement apparatuses 20. For example, the storage unit 130 stores apparatus information of each apparatus installed within the environment. In addition, the storage unit 130 may store the above-described correlation information. Furthermore, the storage unit 130 may store an operation status (e.g., power-on/off, an operation level, or the like) of each of the electronic apparatuses 10. In addition, the storage unit 130 may store a history of a measured value output from each of the measurement apparatuses 20.

In the present embodiment, the operation setting unit 140 sets operations of the electronic apparatuses 10 following an instruction of the mapping determination unit 120. More specifically, in a case in which a certain electronic apparatus 10 and a certain measurement apparatus 20 are mapped by the mapping determination unit 120, the operation setting unit 140 sets the electronic apparatus 10 to operate on the basis of a measurement result acquired from the measurement apparatus 20 as an operation input. For example, the operation setting unit 140 may set the air conditioning apparatus 10a to perform an operation of getting a measured value of temperature acquired from the measurement apparatus 20a closer to a target value. In addition, the operation setting unit 140 may set the television apparatus 10b to change an output volume in accordance with a measured value of volume acquired from any volume sensor. In addition, the operation setting unit 140 may set the heating apparatus 10c to change a heat radiation level in accordance with a measured value of temperature acquired from any temperature sensor. In addition, the operation setting unit 140 may set the humidifier 10d to start an operation in a case in which a measured value of humidity acquired from any humidity sensor is lower than a threshold value. In addition, the operation setting unit 140 may set the interior light 10e to turn on in a case in which any motion detector detects a person. In addition, the operation setting unit 140 may set the air conditioning apparatus 10a to change a target temperature, a capacity, or a power-on or power-off status in accordance with a measured value of a respiratory rate of a person acquired from the measurement apparatus 20b.

As another example, in the case in which a certain electronic apparatus 10 and a certain measurement apparatus 20 are mapped by the mapping determination unit 120, the operation setting unit 140 may set an operation of the electronic apparatus 10 on the basis of a measurement result acquired from the measurement apparatus 20 as an operation input. In this case, for example, the operation setting unit 140 can determine an output volume of the television apparatus 10b in accordance with a measured value of a volume acquired from any volume sensor and set the determined output volume for the television apparatus 10b. In addition, the operation setting unit 140 can determine a heat radiation level of the heating apparatus 10c in accordance with a measured value of a temperature acquired from any temperature sensor and set the determined heat radiation level for the heating apparatus 10c.

In a case in which the air conditioning apparatus 10a performs an operation for getting a measured value of a temperature acquired from the measurement apparatus 20a close to a target value, for example, the target value may be set by the user using, for example, a setting means such as a remote controller or a user interface (e.g., GUI or a sound interface) provided by the organizer 100. In addition, the operation setting unit 140 may automatically set such target values of environmental conditions. The target values of the environmental conditions can be decided by analyzing, for example, operation histories of the electronic apparatuses 10. As an example, among values set by the user within a certain period, a mode or a mean, or a value lastly set by the user may be treated as a target value to be automatically set. In addition, the operation setting unit 140 may determine target values that are different depending on each of dates and time slots from operation histories of the electronic apparatuses 10. In the case in which target values of environmental conditions are automatically set as described above, only by installing a new measurement apparatus at a desired place and connecting the apparatus to the network, the user can quickly start an operation of an electronic apparatus utilizing the measurement apparatus.

In addition, the operation setting unit 140 may set operations of the measurement apparatuses 20 in addition to setting operations of the electronic apparatuses 10 in accordance with results of mapping determinations. For example, the operation setting unit 140 may establish communication connections between the electronic apparatuses 10 and the measurement apparatuses 20 in accordance with a communication protocol supported by both apparatuses. In addition, the operation setting unit 140 may set measurement periods of the measurement apparatuses 20 in accordance with operation requirements of the electronic apparatuses 10. In addition, the operation setting unit 140 may set a measurement result format in which the electronic apparatuses 10 can read measurement results output from the measurement apparatuses 20.

[2-2. Determination of Environmental Commonality]

There is a possibility of the environment 1 illustrated in FIG. 1 being partitioned into two sub-environments (e.g., a living room and a bedroom) by a wall 2. In a case in which apparatuses installed in such two different sub-environments are connected to a common network, it is beneficial to consider environmental commonality when the apparatuses are mapped. Although mapping between electronic apparatuses and measurement apparatuses that are installed in the same sub-environment may be performed using the above-described technique, mapping between electronic apparatuses and measurement apparatuses that are installed in different sub-environments should be avoided (except a case in which mapping is related to an environmental condition that can be affected across the wall 2).

Thus, the mapping determination unit 120 may determine whether an electronic apparatus 10 and a measurement apparatus 20 are associated with a common environment, and in a case in which the electronic apparatus 10 and the measurement apparatus 20 are determined to be associated with the common environment, the mapping determination unit 120 may map the electronic apparatus 10 and the measurement apparatus 20 when measurement condition type information represents a measurement condition type correlating with an affected condition type represented by affected condition type information. Three examples of techniques for determining environmental commonality will be described below.

Figure 8A:
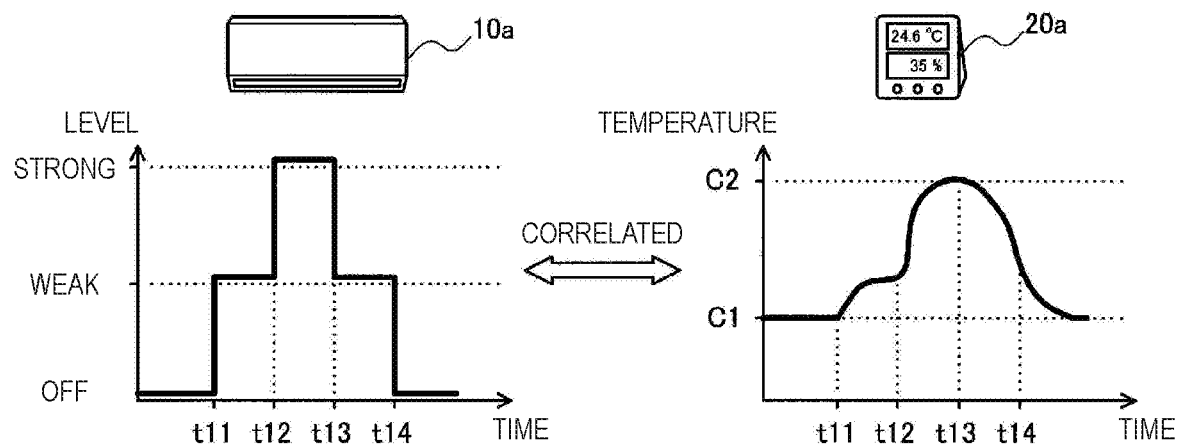
FIG. 8A is a first explanatory diagram for describing a first technique for determining environmental commonality.
Figure 8B:
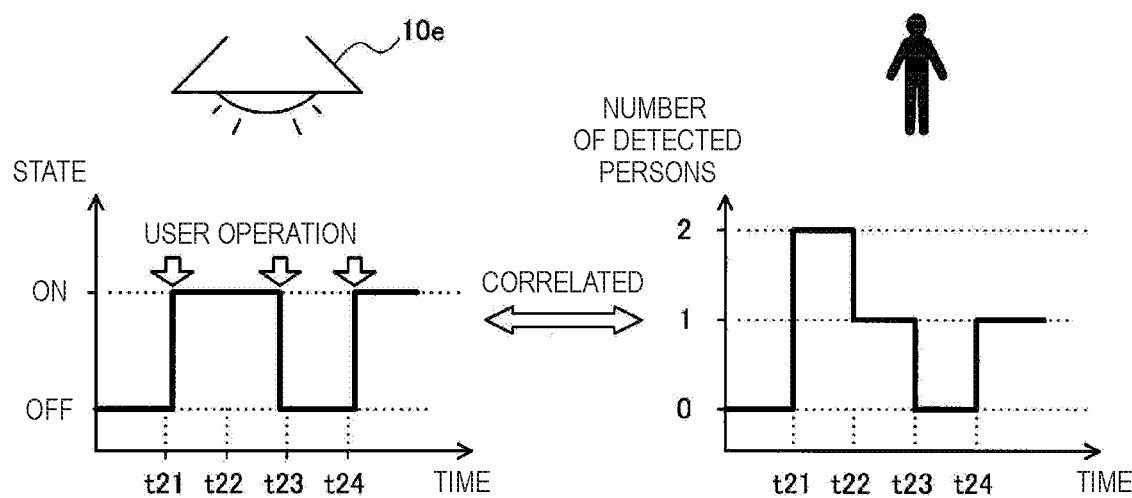
FIG. 8B is a second explanatory diagram for describing the first technique for determining environmental commonality.

As a first example, the mapping determination unit 120 can determine whether an electronic apparatus 10 and a measurement apparatus 20 are associated with a common environment by analyzing a correlation with an operation of the electronic apparatus 10 appearing in an environmental condition measured by the measurement apparatus 20 in a case in which the electronic apparatus 10 is caused to operate. FIG. 8A and FIG. 8B are explanatory diagrams for describing a first technique for determining environmental commonality. On the left side of FIG. 8A, a history of operation levels of the air conditioning apparatus 10a over a period including times t11, t12, t13, and t14 is illustrated. On the right side of FIG. 8A, a history of temperatures that can be output from the measurement apparatus 20a over the same period is illustrated. According to a comparison of these histories, a correlation between operation levels of the air conditioning apparatus 10a and measurement results of the measurement apparatus 20a can be found such that the temperature starts to rise from a value C when the air conditioning apparatus 10a is switched on at the time t11, the temperature increases at a rising pace in accordance with an increase of the level of the air conditioning apparatus 10a at the time t12, the temperature turns from rising from falling in accordance with a decrease of the level of the air conditioning apparatus 10a at the time t13, and the temperature returns to C1 after the air conditioning apparatus 10a is switched off at the time t14. The mapping determination unit 120 can determine that the air conditioning apparatus 10a and the measurement apparatus 20a are associated with a common environment due to the existence of the above-described correlation.

On the left side of FIG. 8B, a history of turn-on and turn-off of the interior light 10e over a period including times t21, t22, t23, and t24 is illustrated. On the right side of FIG. 8B, a history of the number of detected persons that can be output from the motion detector over the same period is illustrated. According to a comparison of these histories, a correlation between turn-on and turn-off states of the interior light 10e and measurement results from the motion detector can be found such that the interior light 10e is turned on when there is a person from the time t21 to the t23, and from the time t24, and the interior light 10e is turned off when there is no person before the time t21 and from the time t23 to the t24. The mapping determination unit 120 can determine that the interior light 10e and the motion detector are associated with a common environment due to the presence of the above-described correlation.

According to the above-described first example, the organizer 100 can automatically determine a combination of apparatuses installed in a common environment, without causing a burden of designating an environment on the user.

Figure 9A:
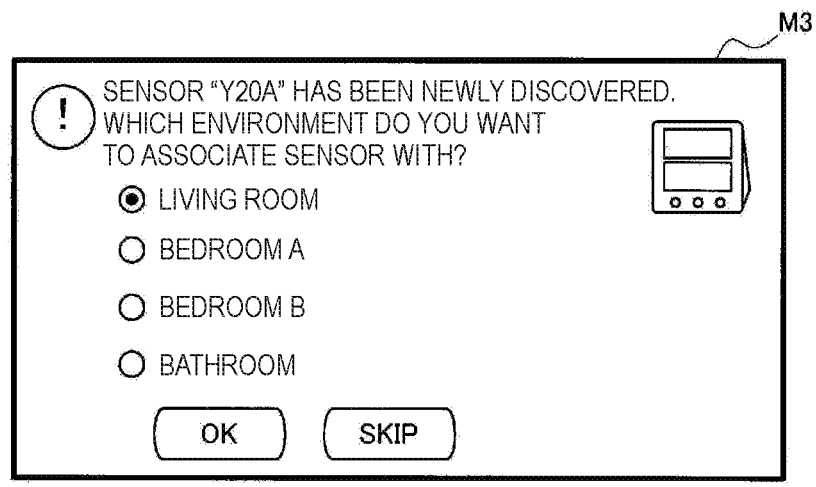
FIG. 9A is a first explanatory diagram for describing a second technique for determining environmental commonality.
Figure 9B:
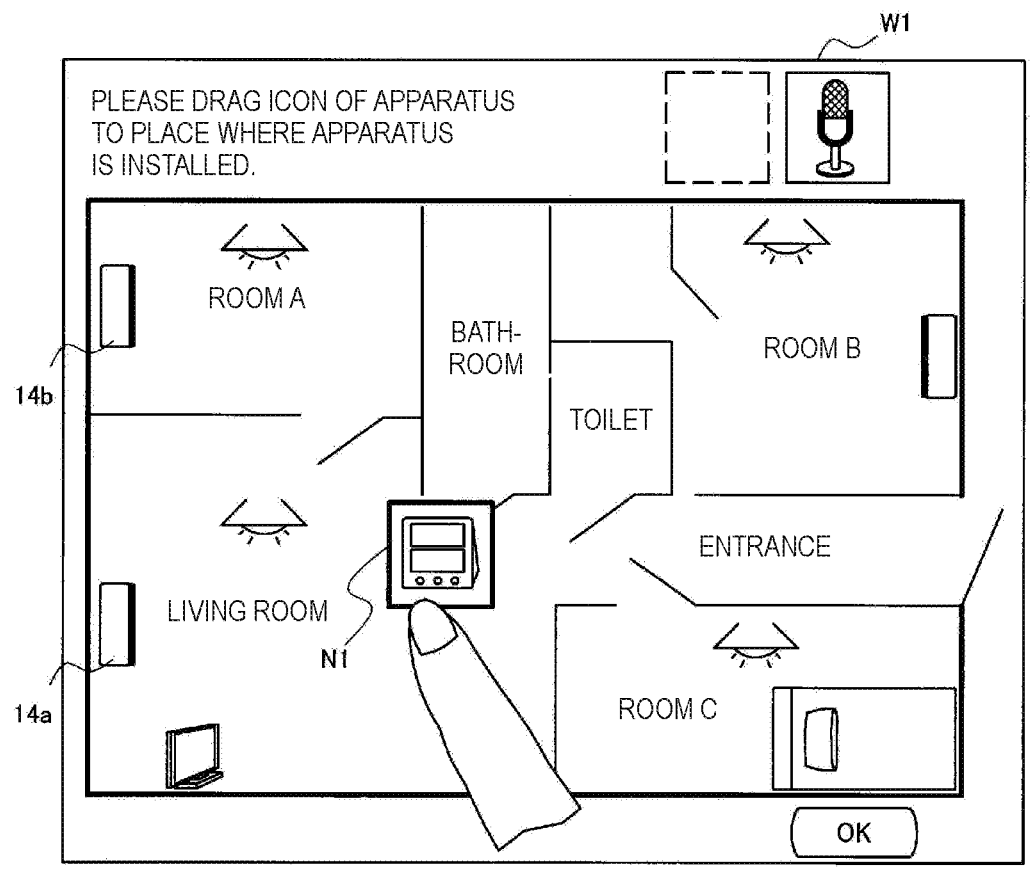
FIG. 9B is a second explanatory diagram for describing the second technique for determining environmental commonality.

As a second example, the mapping determination unit 120 can determine whether an electronic apparatus 10 and a measurement apparatus 20 are associated with a common environment through an interaction with the user. In this case, the user interface unit 110 provides a user interface for causing the user to designate an environment among a plurality of environments to be associated with at least one of the electronic apparatus 10 and the measurement apparatus 20. FIG. 9A and FIG. 9B are explanatory diagrams for describing a second technique for determining environmental commonality. A message M3 illustrated in FIG. 9A is for notifying the user of the face that the measurement apparatus 20a (the sensor "Y20A") has been newly discovered and further inquiring of the user with which sub-environment the measurement apparatus 20a is to be associated with options of existing sub-environments. By selecting one or more suitable options and then touching an "OK" button, the user can designate a suitable sub-environment with which the measurement apparatus 20a is to be associated.

A window W1 illustrated in FIG. 9B is a GUI visually displaying a plurality of sub-environments included in the environment 1 in a floor plan. The user can designate a sub-environment to be associated with each of discovered electronic apparatuses or measurement apparatuses by, for example, dragging and dropping icons representing the apparatuses to suitable places of the sub-environments. In the example of FIG. 9B, an icon N1 representing the measurement apparatus 20a is about to be dragged to and dropped at a living room in the window W1. In this case, the measurement apparatus 20a can be a mapping candidate for an electronic apparatus 14a that has already been associated with the living room. Meanwhile, if the icon N1 is dragged to and dropped at a room A in the window W1, the measurement apparatus 20a can be a mapping candidate for an electronic apparatus 14b that has already been associated with the room A.

According to the above-described second example, the organizer 100 can reliably ascertain which electronic apparatus and measurement apparatus are installed in a common environment, without waiting accumulation of operation and measurement histories.

As a third example, the mapping determination unit 120 may determine whether an electronic apparatus 10 and a measurement apparatus 20 are associated with a common environment by determining whether a determination signal output from a certain signal source is sensed by a target apparatus corresponding to one or both of the electronic apparatus 10 and the measurement apparatus 20. The determination signal mentioned above may be any type of signal such as an optical signal (such as a visible light ray, an infrared light ray, or the like), a radio wave signal, or a sound signal (such as an audible sound or an inaudible sound). The determination signal may be output not from an apparatus in which the organizer 100 is mounted, but from another apparatus. In addition, the determination signal may have a signal pattern for identifying a signal source that is an output source (e.g., a vendor code that can be given to a signal from a remote controller).

FIG. 10 is an explanatory diagram for describing a third technique for determining environmental commonality. Referring to FIG. 10, each of sub-environments 3a and 3b partitioned by the wall 2 is surrounded by dashed lines. The organizer 100 causes the electronic apparatus 10b installed within the sub-environment 3a to output a determination signal. The output determination signal is detected by an electronic apparatus 10f, the measurement apparatus 20a, and the information terminal 40 installed within a range RI, and as a result, it is ascertained that the electronic apparatus 10b, the electronic apparatus 10f, the measurement apparatus 20a, and the information terminal 40 are associated with the common sub-environment 3a. Meanwhile, the determination signal is blocked and attenuated by the wall 2 and thus does not reach the sub-environment 3b. As a result, it is ascertained that the electronic apparatus 10a, 10c, and 10d and the measurement apparatus 20b are not present in the common sub-environment 3a with the electronic apparatus 10b, and the measurement apparatus 20b, for example, is excluded from targets to be mapped to the electronic apparatus 10b.

According to the above-described third example, the organizer 100 can automatically determine a combination of apparatuses installed in a common environment without waiting accumulation of operation and measurement histories and causing a burden of designating an environment on the user.

The mapping determination unit 120 can cause a discovered apparatus to be grouped with an apparatus group to be associated with a common environment (or a sub-environment) by using, for example, any of the above-described methods and determine mapping between the apparatuses included in the same group. In addition, the mapping determination unit 120 can instruct the operation setting unit 140 to set the electronic apparatuses 10 in accordance with the result of the mapping determination.

3. Configuration Example of Electronic Apparatus/Measurement Apparatus

Figure 11:
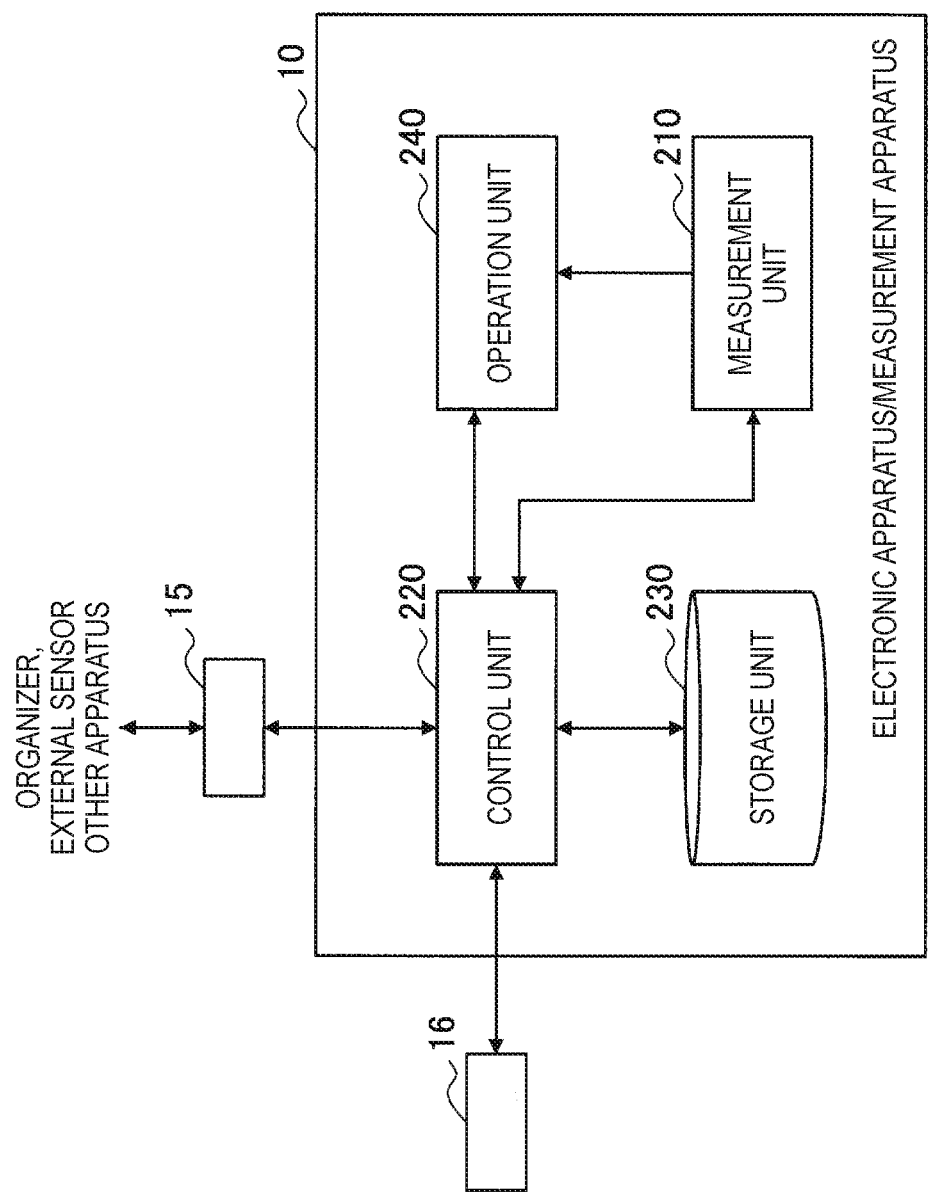
FIG. 11 is a block diagram illustrating an example of a configuration of logical functions of an electronic apparatus according to an embodiment.

FIG. 11 is a block diagram illustrating an example of a configuration of logical functions of an electronic apparatus 10 according to an embodiment. Here, the electronic apparatus 10 is assumed to have a function of performing an operation that affects an environmental condition as well as a function of measuring the environmental condition. Referring to FIG. 11, the electronic apparatus 10 includes a measurement unit 210, a control unit 220, a storage unit 230, and an operation unit 240. The control unit 220 is connected to a communication interface 15 and an input interface 16.

The measurement unit 210 measures at least one of a plurality of environmental conditions. In a case in which the electronic apparatus 10 is an air conditioning apparatus, the measurement unit 210 may be a temperature sensor. In a case in which the electronic apparatus 10 is a humidifier, the measurement unit 210 may be a humidity sensor. The measurement unit 210 may measure a plurality of different types of environmental conditions. In the case in which the electronic apparatus 10 is an air conditioning apparatus, for example, the measurement unit 210 may detect a temperature as a temperature sensor and monitor or detect the presence of a person within an environment as a motion detector. In a case in which the electronic apparatus 10 is set to use measurement results measured by itself as operation inputs, the measurement unit 210 outputs the measurement results to the operation unit 240. In addition, in a case in which measurement results from the electronic apparatus 10 are set to be used by another apparatus as operation inputs, the measurement results output from the measurement unit 210 are output from the control unit 220 to the other apparatus via the communication interface 15.

The control unit 220 controls overall operations of the electronic apparatus 10 using a processor such as a central processing unit (CPU). For example, in a case in which a user input (e.g., an input signal indicating that a button or a switch is pressed, a remote control signal from a remote controller, or the like) is detected via the input interface 16, the control unit 220 controls an operation of the operation unit 240 in accordance with the detected user input.

When the electronic apparatus 10 is connected to a network, the control unit 220 can transmit a connection notification message on the network serving as a connection destination via the communication interface 15. In a case in which the organizer 100 is present on the network, the connection notification message is received by the organizer 100 and as a result the electronic apparatus 10 is discovered by the organizer 100. Instead, the control unit 220 may cause the organizer 100 to discover the electronic apparatus 10 by replying with a search response message via the communication interface 15 in response to an apparatus search message transmitted from the organizer 100.

After the organizer 100 discovers the electronic apparatus 10, the control unit 220 provides apparatus information of the electronic apparatus 10 or access information to be used to access the apparatus information of the electronic apparatus 10 to the organizer 100. The apparatus information of the electronic apparatus 10 can include affected condition type information representing a type of environmental condition affected by the operation unit 240 and measurement condition type information representing a type of environmental condition measured by the measurement unit 210. In addition, the control unit 220 may also provide correlation information in addition to the apparatus information of the electronic apparatus 10 to the organizer 100. Thereafter, when the organizer 100 maps the electronic apparatus 10 to another apparatus on the basis of the affected condition type information and the measurement condition type information, the control unit 220 can receive a setting signal from the organizer 100. For example, in a case in which the electronic apparatus 10 is mapped to another measurement apparatus, the control unit 220 can set the operation unit 240 to operate using measurement results output from the other measurement apparatus instead of the measurement unit 210 as operation inputs. In addition, in a case in which the electronic apparatus 10 serving as a measurement apparatus is mapped to another electronic apparatus, the control unit 220 can transmit results of measurements executed by the measurement unit 210 to the network from the communication interface 15 in a designated format at designated cycles.

The storage unit 230 stores various kinds of data that are necessary for measurement and operations performed by electronic apparatus 10. For example, the storage unit 230 may store apparatus information of the electronic apparatuses 10 in advance. In addition, the storage unit 230 may store correlation information defining one or more environmental conditions correlating with an environmental condition affected by the operation unit 240 in advance. In addition, the storage unit 230 may store operation setting information regarding an operation setting of the operation unit 240 and measurement setting information regarding a measurement setting of the measurement unit 210.

The operation unit 240 performs operations that affect at least one environmental condition. For example, in a case in which an electronic apparatus 10 is an air conditioning apparatus, the operation unit 240 causes heated or cooled air to be emitted to the environment so that a temperature measured value gets close to a target value. In addition, in a case in which an electronic apparatus 10 is a humidifier, the operation unit 240 causes moisture to be released at a level determined on the basis of a humidity measured value. When the organizer 100 maps the electronic apparatus 10 to another measurement apparatus, the operation unit 240 uses a measurement result output from the other measurement apparatus as an operation input in accordance with the result of the mapping determination.

4. Flow of Processing

[4-1. Processing of Organizer]

(1) Setting Process

Figure 12:
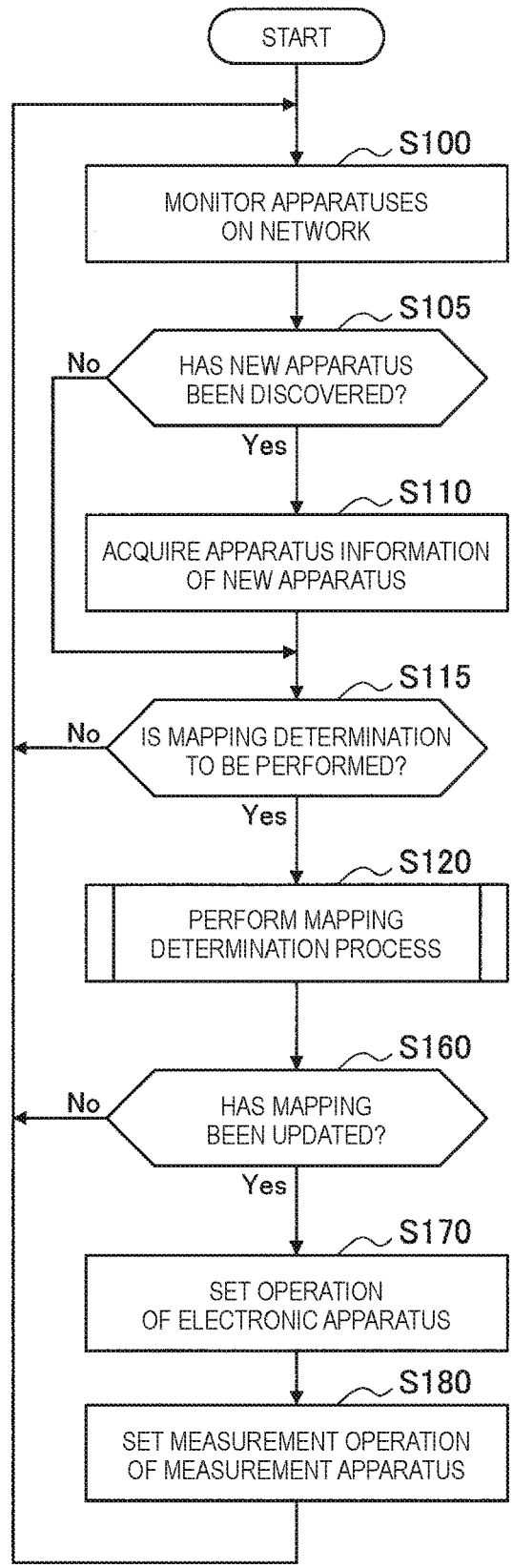
FIG. 12 is a flowchart showing an example of a flow of a setting process executed by an organizer according to an embodiment.

FIG. 12 is a flowchart showing an example of a flow of a setting process executed by the organizer 100 according to an embodiment. The setting process illustrated in FIG. 12 can be periodically repeated by the organizer 100. Instead, the organizer 100 may execute a similar setting process to the illustrated one when the process is triggered by an instruction from the user.

First, the mapping determination unit 120 monitors apparatuses on the network by awaiting a connection notification message to be transmitted on the network, or broadcasting an apparatus search message onto the network and awaiting a search response message (Step S100). Next, when discovering a new apparatus connected to the network (Step S105), the mapping determination unit 120 acquires apparatus information of the new apparatus (Step S110).

Next, the mapping determination unit 120 determines whether or not mapping determining is to be performed (Step S115). In a case in which a new apparatus is connected to the network or an existing apparatus contributing to existing mapping leaves the network, for example, the mapping determination unit 120 can determine that mapping determination is to be performed. In a case in which mapping determination is determined not to be performed, the setting process illustrated in FIG. 12 returns to Step S100. In a case in which mapping determination is determined to be performed, the mapping determination unit 120 executes the mapping determination process (Step S120). A detailed flow of the mapping determination process to be executed here will be described further below.

The following processes branch off depending on whether or not mapping is updated as a result of the mapping determination process. In a case in which mapping is not updated, the setting process illustrated in FIG. 12 returns to Step S100. In a case in which mapping is updated, the operation setting unit 140 sets an operation of the electronic apparatus 10 in accordance with an instruction from the mapping determination unit 120 (Step S170). In addition, the operation setting unit 140 sets a measurement operation of the measurement apparatus 20 (Step S180).

(2) Mapping Determination Process—First Example

Figure 13A:
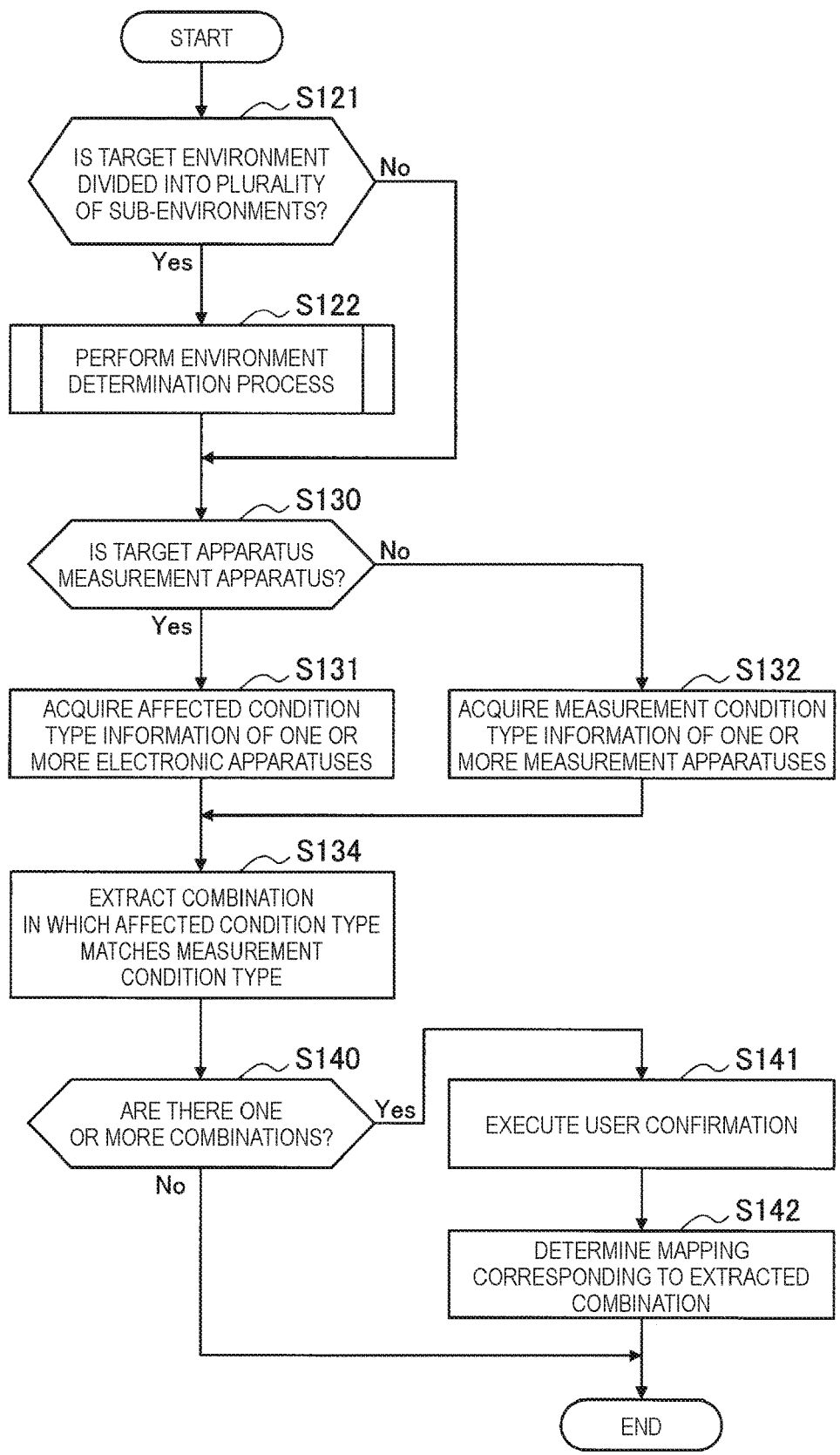
FIG. 13A is a flowchart showing a first example of a flow of the mapping determination process illustrated in FIG. 12.

FIG. 13A is a flowchart showing a first example of the flow of the mapping determination process illustrated in FIG. 12. In the first example, the mapping determination unit 120 determines whether an affected condition type matches a measurement condition type as described using FIG. 5A and FIG. 6A. In the following description, a target apparatus can be, for example, an electronic apparatus or a measurement apparatus newly discovered on the network. However, even in a case in which re-mapping is performed on an electronic apparatus or a measurement apparatus has been mapped to an apparatus before that left the network, a similar mapping determination process to the illustrated one can be executed.

Referring to FIG. 13A, first, the mapping determination unit 120 determines whether or not a target environment is divided into a plurality of sub-environments (Step S121). In a case in which the target environment is divided into a plurality of sub-environments, the mapping determination unit 120 executes an environment determination process and determines in which sub-environment a target apparatus is installed (Step S122). A detailed flow of the environment determination process executed here will be further described below.

Next, in a case in which the target apparatus is a measurement apparatus (Step S130), the mapping determination unit 120 acquires affected condition type information of one or more electronic apparatuses within the environment (within the sub-environment) collected in the past (Step S131). In addition, in a case in which the target apparatus is an electronic apparatus, the mapping determination unit 120 acquires measurement condition type information of one or more measurement apparatuses within the environment (within the sub-environment) collected in the past (Step S132). Next, the mapping determination unit 120 extracts a combination in which the affected condition type matches the measurement condition type by collating affected (measurement) condition type information of the target apparatus with measurement (affected) condition type information of another apparatus (Step S134).

In a case in which no combination in which the affected condition type matches the measurement condition type is extracted as a result of Step S134, mapping between the apparatuses is not performed and the mapping determination process ends. On the other hand, in a case in which one or more combinations in which the affected condition type matches the measurement condition type is extracted, the mapping determination unit 120 executes user confirmation if necessary as described using FIG. 5B or FIG. 6B (Step S141). Then, the mapping determination unit 120 determines mapping corresponding to the extracted combination of the electronic apparatus and the measurement apparatus (Step S142).

(3) Mapping Determination Process—Second Example

Figure 13B:
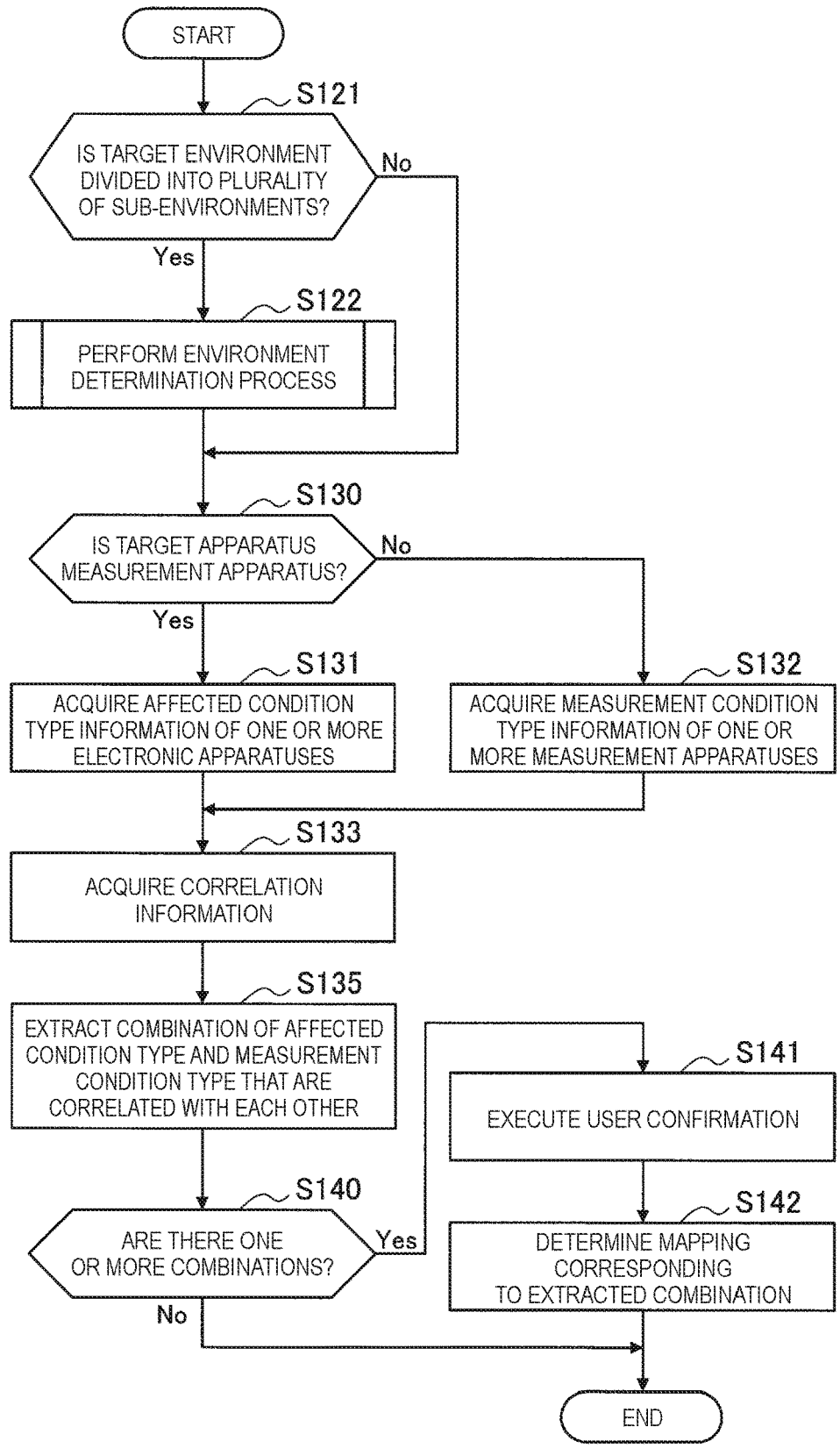
FIG. 13B is a flowchart showing a second example of a flow of the mapping determination process illustrated in FIG. 12.

FIG. 13B is a flowchart showing a second example of the flow of the mapping determination process illustrated in FIG. 12. In the second example, the mapping determination unit 120 determines whether the affected condition type and the measurement condition type are related using correlation information as described in FIG. 7.

Referring to FIG. 13B, first, the mapping determination unit 120 determines whether or not the target environment is divided in to a plurality of sub-environments (Step S121). In a case in which the target environment is divided in to a plurality of sub-environments, the mapping determination unit 120 executes the environment determination process and determines in which sub-environment the target apparatus is installed (Step S122).

Next, in the case in which the target apparatus is a measurement apparatus (Step S130), the mapping determination unit 120 acquires affected condition type information of one or more electronic apparatuses within the environment (within a sub-environment) collected in the past (Step S131). In addition, in the case in which the target apparatus is an electronic apparatus, the mapping determination unit 120 acquires measurement condition type information of one or more measurement apparatuses within the environment (within the sub-environment) collected in the past (Step S132). In addition, the mapping determination unit 120 acquires correlation information defining a correlation of the affected condition type and the measurement condition type in advance (Step S133). Next, the mapping determination unit 120 extracts a combination of the affected condition type and the measurement condition type that correlate with each other using affected (measurement) condition type information of the target apparatus, measurement (affected) condition type information of another apparatus, and the correlation information (Step S135).

In a case in which no combination of the affected condition type and the measurement condition type that correlate with each other is extracted as a result of Step S135, the mapping determination process ends without performing mapping between the apparatuses. On the other hand, in a case in which one or more combinations of the affected condition type and the measurement condition type that correlate with each other is extracted, the mapping determination unit 120 executes user confirmation if necessary (Step S141). Then, the mapping determination unit 120 determines mapping corresponding to the extracted combinations.

(4) Environment Determination Process—First Example

Figure 14A:
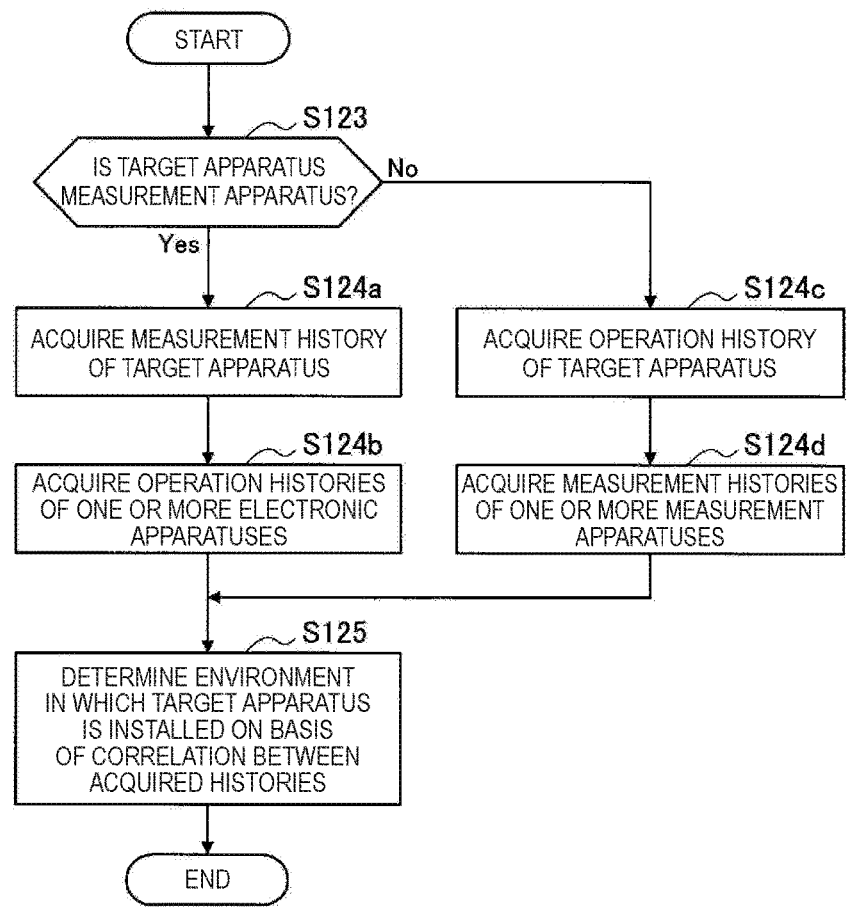
FIG. 14A is a flowchart showing a first example of a flow of the environment determination process illustrated in FIG. 13A and FIG. 13B.

FIG. 14A is a flowchart showing a first example of a flow of the environment determination process illustrated in FIG. 13A and FIG. 13B.

Referring to FIG. 14A, first, in a case in which the target apparatus is a measurement apparatus (Step S123), the mapping determination unit 120 acquires a measurement history (a set of time-series measurement results) of the target apparatus over a certain period (Step S124a). In addition, the mapping determination unit 120 acquires each of operation histories of one or more electronic apparatuses within the environment over a certain period (Step S124b). On the other hand, in a case in which the target apparatus is an electronic apparatus, the mapping determination unit 120 acquires an operation history (a set of time-series operation statuses) of the target apparatus over a certain period (Step S124c). In addition, the mapping determination unit 120 acquires each of measurement histories of one or more measurement apparatuses within the environment over a certain period (Step S124d).

Next, the mapping determination unit 120 specifies another apparatus with a history indicating the most significant correlation with the history of the target apparatus by comparing the acquired histories, and determines that the environment in which the specified other apparatus has already been installed is an environment in which the target apparatus is installed (Step S125).

(5) Environment Determination Process—Second Example

Figure 14B:
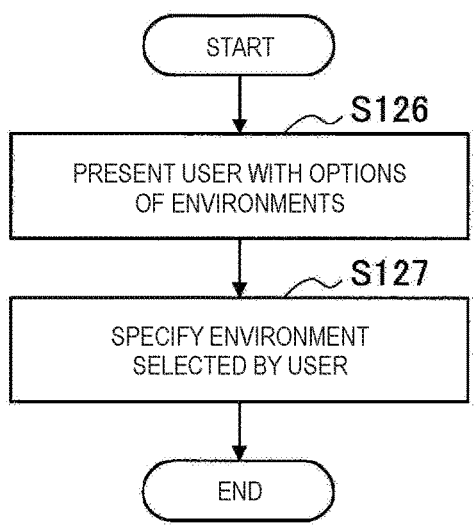
FIG. 14B is a flowchart showing a second example of a flow of the environment determination process illustrated in FIG. 13A and FIG. 13B.

FIG. 14B is a flowchart showing a second example of the flow of the environment determination process illustrated in FIG. 13A and FIG. 13B.

Referring to FIG. 14B, first, the mapping determination unit 120 presents the user with options of environments (Step S126). Here, for example, the message or the window described in FIG. 9A or FIG. 9B may be displayed on a screen. Instead, a voice message may be output. Next, the mapping determination unit 120 specifies an environment selected by the user among the options presented in Step S126 (Step S127).

(6) Environment Determination Process—Third Example

Figure 14C:
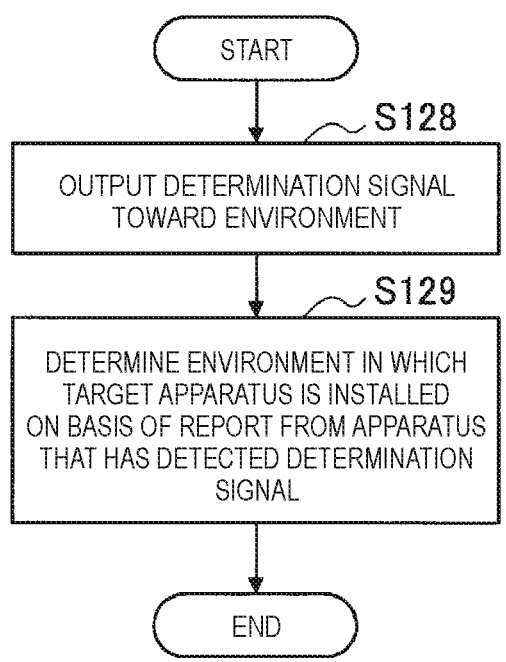
FIG. 14C is a flowchart showing a third example of a flow of the environment determination process illustrated in FIG. 13A and FIG. 13B.

FIG. 14C is a flowchart showing a third example of the flow of the environment determination process illustrated in FIG. 13A and FIG. 13B.

Referring to FIG. 14C, first, the mapping determination unit 120 causes one or more signal sources existing in the environment to output a determination signal toward the environment (Step S128). Then, the mapping determination unit 120 determines an environment in which the target apparatus is installed on the basis of a report from an apparatus that has sensed the determination signal (Step S129). Note that the output of the determination signal may be repeated a plurality of times until the target apparatus senses the determination signal or until any other apparatus senses a determination signal output from the target apparatus. In addition, in a case in which the apparatus serving as the output source of the determination signal can be identified from a signal pattern included in the determination signal, a plurality of apparatuses that are installed in different environments may output determination signals in parallel.

[4-2. Processing of Electronic Apparatus]

Figure 15:
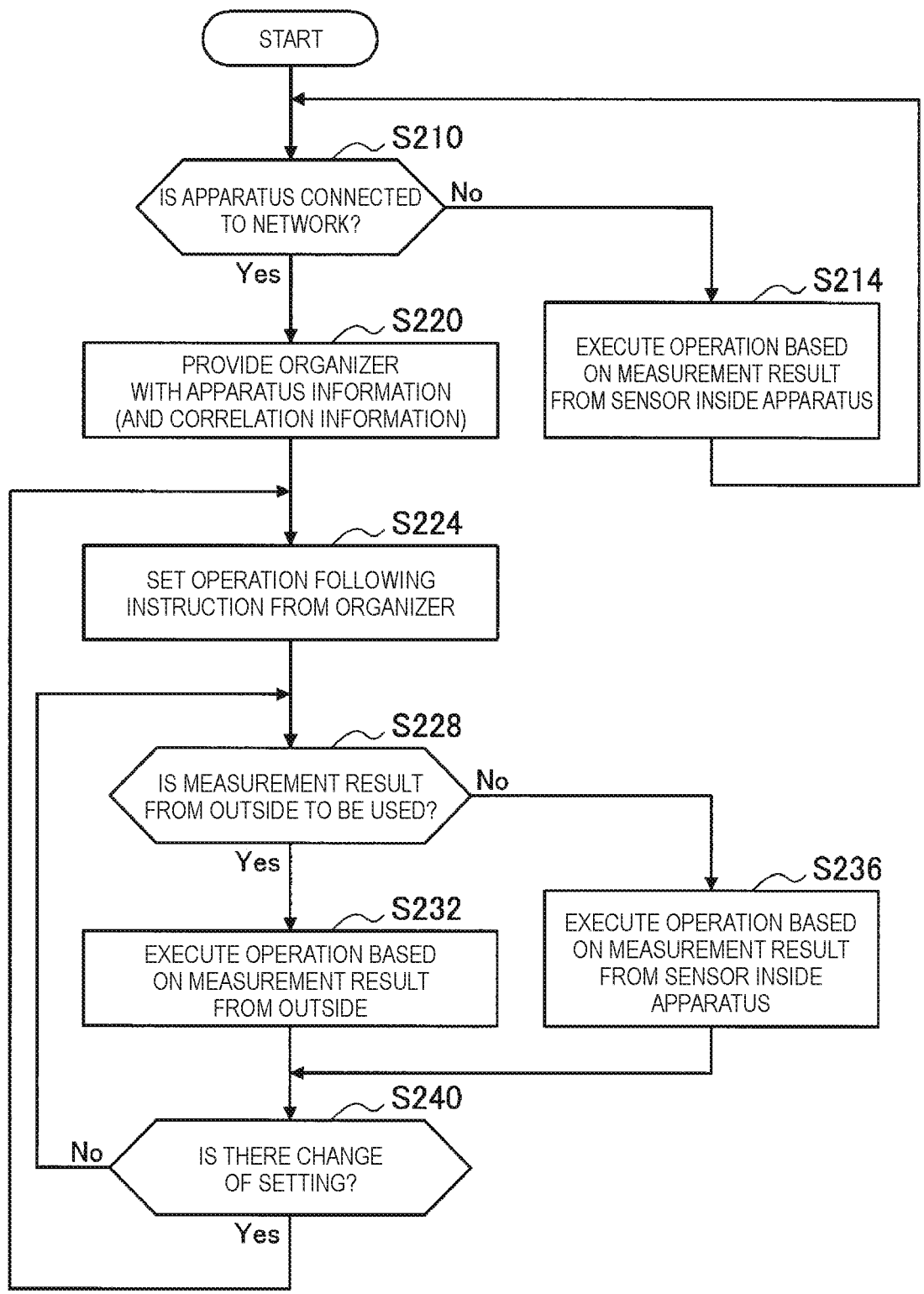
FIG. 15 is a flowchart showing an example of a flow of a process related to an operation executed by an electronic apparatus according to an embodiment.

FIG. 15 is a flowchart showing an example of a flow of a process related to an operation executed by an electronic apparatus according to an embodiment. Here, it is assumed that a new electronic apparatus 10 is installed in the environment and the electronic apparatus 10 is connected to the network.

First, the control unit 220 of the electronic apparatus 10 monitors whether or not the apparatus itself is connected to the network (Step S210). In a case in which the electronic apparatus 10 is not connected to the network, the operation unit 240 executes a unique operation on the basis of a measurement result from a measurement unit 210 corresponding to a sensor built in the electronic apparatus 10 (Step S214).

When detecting the apparatus itself being connected to the network, the control unit 220 of the electronic apparatus 10 exchanges messages with the organizer 100 and provides the organizer 100 with apparatus information of the apparatus itself (Step S220). If necessary, the organizer 100 may be provided with correlation information as well.

Thereafter, the control unit 220 sets an operation of the operation unit 240 following an instruction from the organizer 100 that has performed the above-described mapping determination on the basis of affected condition type information included in the apparatus information of the apparatus and measurement condition type information of one or more measurement apparatuses (Step S224). More specifically, the control unit 220 sets the operation unit 240 to receive a measurement result output from an apparatus specified by the organizer 100 as a result of the mapping determination as an operation input.

Then, in a case in which the operation unit 240 is set to use a measurement result from outside (another apparatus) as an operation input (Step S228), the operation unit executes an operation based on the measurement result from outside as set (Step S232). On the other hand, in a case in which the operation unit is set not to use a measurement result from outside for the reason that there is no suitable mapping partner or the like, the operation unit 240 executes an operation based on a measurement result from a measurement unit 210 corresponding to a sensor inside the apparatus (Step S236).

The operation of the electronic apparatus 10 in Step S232 or Step S236 can be repeated until the setting for the operation input is changed (Step S240). In a case in which the setting for the operation input is changed, a new operation setting can be instructed by the organizer 100 again (Step S224).

[4-3. Processing of Measurement Apparatus]

Figure 16:
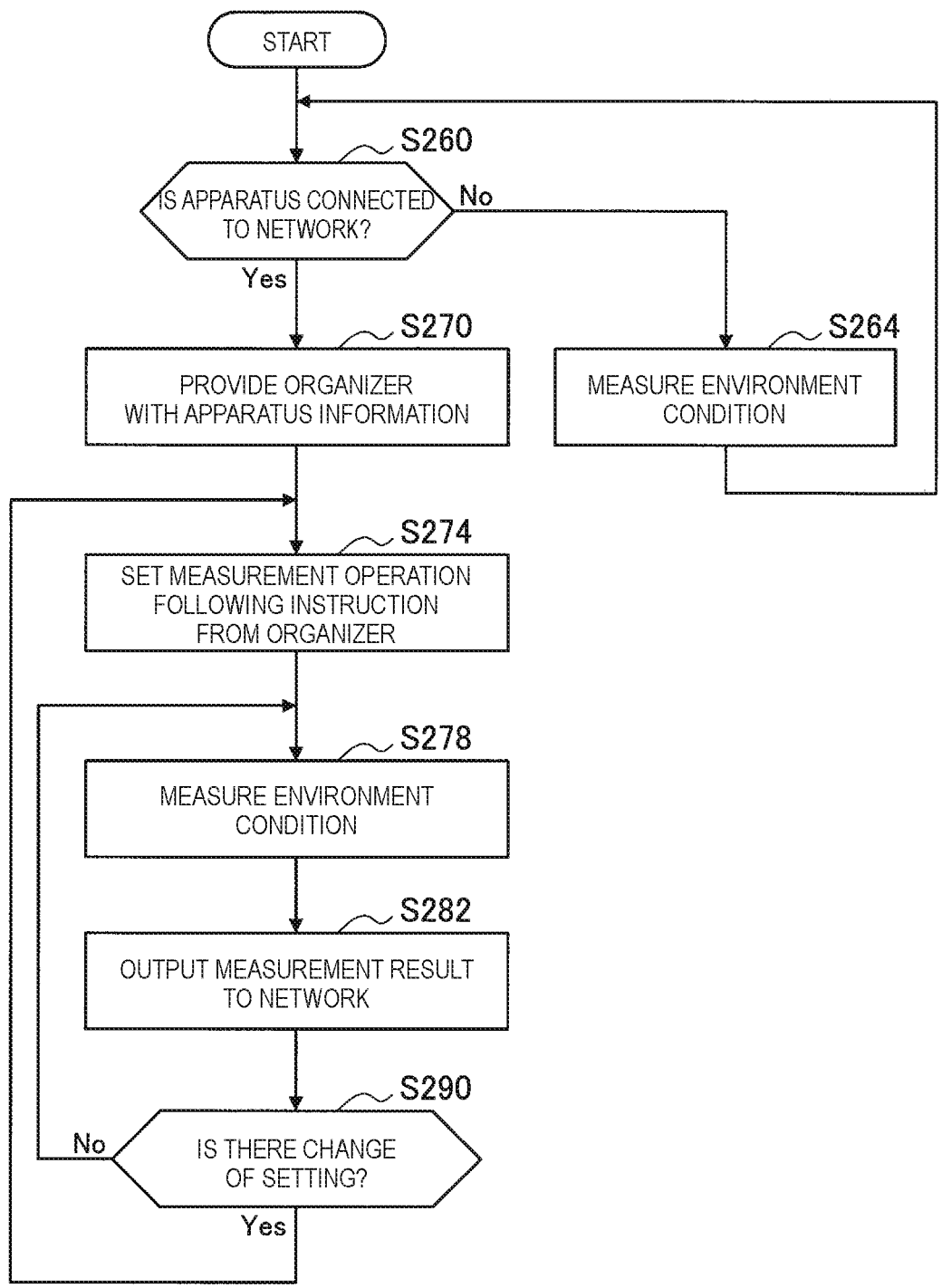
FIG. 16 is a flowchart showing an example of a flow of a process related to measurement executed by a measurement apparatus according to an embodiment.

FIG. 16 is a flowchart showing an example of a flow of a process related to measurement executed by a measurement apparatus according to an embodiment. Here, it is assumed that a new measurement apparatus 20 is installed within an environment and the measurement apparatus 20 is connected to the network.

First, the control unit 220 of the measurement apparatus 20 monitors whether or not the apparatus itself is connected to the network (Step S260). In a case in which the measurement apparatus 20 is not connected to the network, the measurement unit 210 measures an environmental condition and locally stores a measurement result or displays the measurement result on a display (Step S264).

When detecting the apparatus itself being connected to the network, the control unit 220 of the measurement apparatus 20 exchanges messages with the organizer 100 and then provides the organizer 100 with apparatus information of the apparatus itself (Step S270). If necessary, correlation information is provided to the organizer 100 as well.

Thereafter, the control unit 220 sets a measurement operation of the measurement unit 210 following an instruction from the organizer 100 that has performed the above-described mapping determination on the basis of measurement condition type information included in the apparatus information of the apparatus itself and affected condition type information of one or more electronic apparatuses (Step S274).

Then, the measurement unit 210 measures the environmental condition as set. The measurement unit 210 may locally store a measurement result or display the measurement result on a display also in this case. In addition, the measurement unit 210 outputs the measurement result to the network (Step S282).

The measurement operation of the measurement apparatus 20 in Step S278 and Step S282 can be repeated until the setting is changed (Step S290). In a case in which the setting is changed, a new measurement operation setting can be instructed by the organizer 100 again (Step S274).

6. Conclusion

The embodiments of the technology according to the present disclosure have been described above using FIG. 1 to FIG. 16. According to the above-described embodiments, on the basis of affected condition type information representing affected condition types of electronic apparatuses that affect at least one environmental condition and measurement condition type information representing measurement condition types of measurement apparatuses that measure at least one environmental condition, mapping between the measurement apparatuses and the electronic apparatuses is determined, and as an apparatus that uses a measurement result from a measurement apparatus that is mapped to a certain electronic apparatus as an operation input, the electronic apparatus is set. By realizing such automatic mapping between apparatuses, it is easy for users to install a sensor separately from electronic apparatuses and operate the electronic apparatuses on the basis of outputs of the sensors.

As an example, a user can freely install a separate temperature sensor, not a temperature sensor built in by an air conditioning apparatus, at a desired place within an environment and the air conditioning apparatus is operated such that a temperature of the installation place reaches a target value. For example, if a temperature sensor is installed in the vicinity of a user (or a user carries or wears a temperature sensor) and outputs from the temperature sensor is used, a temperature perceived by the user can easily reach a target value in an efficient manner. In addition, the user can install a plurality of temperature sensors in a room and the air conditioning apparatus can be operated such that temperatures measured by the temperature sensors become as uniform as possible. In addition, different operation target values may be set for the plurality of temperature sensors (e.g., each corresponding to family members). As another example, it may be easy for a user to construct a mechanism in which a motion detector is installed at a desired place, and an electronic apparatus such as an air conditioning apparatus, a heating apparatus, or an illuminance apparatus is switched on in a case in which the presence of a person is detected by the motion detector, and the apparatus is switched off in a case in which no presence of a person is detected. It was generally difficult to construct such a mechanism in the past because expertise was necessary. However, according to the above-described embodiments, in a case in which a user purchases a measurement apparatus separately from an electronic apparatus, a case in which a terminal possessed by a user has any measurement function, or the like, such a measurement apparatus or measurement function and another electronic apparatus can be easily set to collaborate with each other via a home network.

In addition, according to the above-described embodiments, in a case in which a measurement condition type correlating with an affected condition type represented by affected condition type information of a certain electronic apparatus is represented by measurement condition type information of a certain measurement apparatus, these electronic apparatus and measurement apparatus are mapped to each other. Thus, by defining affected condition types and measurement condition types of each of apparatuses in advance, it is possible to determine mapping between apparatuses using a simple and general method of collation of such type information. In a case in which correlation or non-correlation is determined on the basis of match or mismatch between an affected condition type and a measurement condition type, only affected condition type information and measurement condition type information may be defined for the determination. In a case in which correlation information that defines a correlation between an affected condition type and a measurement condition type in advance is provided for mapping determination, it is possible to construct various collaboration mechanisms by utilizing a correlation between two different types of environmental conditions. For example, it is also possible to cause an electronic apparatus such as an air conditioning apparatus, a heating apparatus, or a humidifier to autonomously control its operations considering influence of a non-biological condition such as a temperature or humidity of an environment on a biological condition (e.g., a pulse rate, a respiratory rate, or the like) of a human.

In addition, according to the above-described embodiments, only in a case in which an electronic apparatus and a measurement apparatus are determined to be associated with a common environment, the apparatuses can be mapped to each other. Thus, also in a case in which a home network is constructed across a plurality of environments that are spatially partitioned, for example, it is possible to avoid useless formation of mapping between electronic apparatuses and measurement apparatuses connected to each other via the home network which is caused by environmental discrepancies.

As described above, according to the technology of the present disclosure, the concept of IoT aiming to provide users with more advanced values by networking various apparatuses to collaborate with each other can also be realized in environmental condition control.

Note that the processing of each of the apparatuses described in the present specification may be realized using any combination of software, hardware, and software and hardware. Programs configuring software are stored in, for example, storage media (non-transitory media) provided inside or outside each of the apparatuses in advance. Therefore, each of the programs is read by, for example, a random access memory (RAM) at the time of execution and executed by a processor such as a CPU.

In addition, the processes described using the flowcharts in the present specification may not be necessarily executed in the orders shown in the flowcharts. Some of the processing steps may be executed in parallel. In addition, additional processing steps may be employed and some of the processing steps may be omitted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
a determination unit configured to determine, on a basis of first type information representing an affected condition type of an electronic apparatus that affects at least one of a plurality of environmental conditions and second type information representing a measurement condition type of a measurement apparatus that measures at least one of the plurality of environmental conditions, whether the electronic apparatus is to be set as an apparatus that uses a measurement result from the measurement apparatus as an operation input.

(2)

The information processing device according to (1), in which, in a case in which the second type information represents a measurement condition type correlating with an affected condition type represented by the first type information, the determination unit determines to set the electronic apparatus as an apparatus that uses a measurement result from the measurement apparatus as an operation input.

(3)

The information processing device according to (2), in which the determination unit determines whether or not the measurement condition type represented by the second type information correlates with the affected condition type represented by the first type information in accordance with correlation information defining a correlation between the affected condition type and the measurement condition type in advance.

(4)

The information processing device according to (2) or (3), in which, in a case in which the second type information represents a measurement condition type that matches an affected condition type represented by the first type information, the determination unit determines to set the electronic apparatus as an apparatus that uses a measurement result from the measurement apparatus as an operation input.

(5)

The information processing device according to any one of (2) to (4), in which, in a case in which the electronic apparatus and the measurement apparatus are determined to be associated with a common environment, when the second type information represents the measurement condition type correlating with the affected condition type represented by the first type information, the determination unit determines to set the electronic apparatus as an apparatus that uses a measurement result from the measurement apparatus as an operation input.

(6)

The information processing device according to (5), in which the determination unit determines whether the electronic apparatus and the measurement apparatus are associated with a common environment by analyzing a correlation with an operation of the electronic apparatus appearing in an environmental condition measured by the measurement apparatus in a case in which the electronic apparatus is caused to operate.

(7)

The information processing device according to (5), in which the determination unit further includes a user interface unit configured to provide a user interface for causing a user to designate an environment among a plurality of environments to be associated with at least one of the electronic apparatus and the measurement apparatus.

(8)

The information processing device according to (5), in which the determination unit determines whether the electronic apparatus and the measurement apparatus are associated with a common environment by determining whether a determination signal output from a certain signal source is sensed by a target apparatus.

(9)

The information processing device according to any one of (1) to (8), further including:
a setting unit configured to set the electronic apparatus to operate on a basis of a measurement result acquired from the measurement apparatus as an operation input in a case in which the electronic apparatus is determined to be set as an apparatus that uses the measurement result from the measurement apparatus as the operation input by the determination unit.

(10)

The information processing device according to any one of (1) to (9), further including:
a setting unit configured to set an operation of the electronic apparatus on a basis of a measurement result acquired from the measurement apparatus as an operation input in a case in which the electronic apparatus is determined to be set as an apparatus that uses the measurement result from the measurement apparatus as the operation input by the determination unit.

(11)

The information processing device according to (9) or (10), in which the setting unit further sets a target value of an environmental condition for an operation of the electronic apparatus.

(12)

The information processing device according to any one of (1) to (11), in which the environmental conditions include at least one of a non-biological condition and a biological condition.

(13)

The information processing device according to any one of (1) to (12).

in which the information processing device is mounted in the electronic apparatus, and the information processing device further includes a communication unit configured to receive the second type information from the measurement apparatus.

(14)

The information processing device according to any one of (1) to (12), in which the information processing device is mounted in the measurement apparatus, and the information processing device further includes a communication unit configured to receive the first type information from the electronic apparatus.

(15)

The information processing device according to any one of (1) to (12), further including:

a communication unit configured to receive the first type information from the electronic apparatus and receive the second type information from the measurement apparatus.

(16)

An electronic apparatus including:

an operation unit configured to perform an operation that affects at least one of a plurality of environmental conditions; and a control unit configured to set the operation unit to use a measurement result from a measurement apparatus, which measures at least one of the plurality of environmental conditions, as an operation input in accordance with a result of determination based on first type information representing an affected condition type of the operation unit and second type information representing a measurement condition type of the measurement apparatus.

(17)

An information processing method executed by an information processing device, the information processing method including:

acquiring first type information representing an affected condition type of an electronic apparatus that affects at least one of a plurality of environmental conditions;

acquiring second type information representing a measurement condition type of a measurement apparatus that measures at least one of the plurality of environmental conditions; and determining whether the electronic apparatus is to be set as an apparatus that uses a measurement result from the measurement apparatus as an operation input on a basis of the first type information and the second type information.

(18)

An operation method of an electronic apparatus that includes an operation unit configured to perform an operation that affects at least one of a plurality of environmental conditions, the operation method including:

setting the operation unit to use a measurement result from a measurement apparatus, which measures at least one of the plurality of environmental conditions, as an operation input in accordance with a result of determination based on first type information representing an affected condition type of the operation unit and second type information representing a measurement condition type of the measurement apparatus; and performing the operation using a measurement result from the measurement apparatus as an operation input in accordance with the setting.

(19)

A program causing a processor of an information processing device to function as:

a determination unit configured to determine, on a basis of first type information representing an affected condition type of an electronic apparatus that affects at least one of a plurality of environmental conditions and second type information representing a measurement condition type of a measurement apparatus that measures at least one of the plurality of environmental conditions, whether the electronic apparatus is to be set as an apparatus that uses a measurement result from the measurement apparatus as an operation input.

(20)

A program causing a processor of an electronic apparatus, which includes an operation unit configured to perform an operation that affects at least one of a plurality of environmental conditions, to function as:

a control unit configured to set the operation unit to use a measurement result from a measurement apparatus, which measures at least one of the plurality of environmental conditions, as an operation input in accordance with a result of determination based on first type information representing an affected condition type of the operation unit and second type information representing a measurement condition type of the measurement apparatus.

REFERENCE SIGNS LIST 1 environment
3a, 3b sub-environment
100 information processing device (organizer)
110 user interface unit
120 mapping determination unit
130 storage unit
140 operation setting unit
10 electronic apparatus
20 measurement apparatus
210 measurement unit
220 control unit
230 storage unit
240 operation unit

The invention claimed is:

1. An information processing device comprising:
a determination unit configured to determine, on a basis of a comparison of first type information representing an affected condition type of environmental condition affected by an electronic apparatus that affects at least one of a plurality of environmental conditions and second type information representing a measurement condition type of environmental condition measured by a measurement apparatus that measures at least one of the plurality of environmental conditions, whether the electronic apparatus is to be set as an apparatus that uses a measurement result from the measurement apparatus as an operation input,
wherein the determination unit is implemented via at least one processor.

2. The information processing device according to claim 1, wherein the determination unit determines to set the electronic apparatus as an apparatus that uses a measurement result from the measurement apparatus as an operation input, based on a determination that the second type information representing a measurement condition type correlates with an affected condition type represented by the first type information.

3. The information processing device according to claim 2, wherein the determination unit determines whether or not the measurement condition type represented by the second type information correlates with the affected condition type represented by the first type information in accordance with correlation information defining a correlation between the affected condition type and the measurement condition type in advance.

4. The information processing device according to claim 2, wherein the determination unit determines to set the electronic apparatus as an apparatus that uses a measurement result from the measurement apparatus as an operation input, based on a determination that the second type information represents a measurement condition type that matches an affected condition type represented by the first type information.

5. The information processing device according to claim 2, wherein, when the second type information represents the measurement condition type correlating with the affected condition type represented by the first type information, the determination unit determines to set the electronic apparatus as an apparatus that uses a measurement result from the measurement apparatus as an operation input, based on a determination that the electronic apparatus and the measurement apparatus are associated with a common environment.

6. The information processing device according to claim 5, wherein the determination unit determines whether the electronic apparatus and the measurement apparatus are associated with a common environment by analyzing a correlation between a time an operation of the electronic apparatus and an environmental condition measured at the time by the measurement apparatus.

7. The information processing device according to claim 5, wherein the determination unit further includes a user interface unit configured to provide a user interface for causing a user to designate an environment among a plurality of environments to be associated with at least one of the electronic apparatus and the measurement apparatus.

8. The information processing device according to claim 5, wherein the determination unit determines whether the electronic apparatus and the measurement apparatus are associated with a common environment by determining whether a determination signal output from a certain signal source is sensed by a target apparatus.

9. The information processing device according to claim 1, further comprising:
a setting unit configured to set the electronic apparatus to operate on a basis of a measurement result acquired from the measurement apparatus as an operation input in a case in which the electronic apparatus is determined to be set as an apparatus that uses the measurement result from the measurement apparatus as the operation input by the determination unit,
wherein the setting unit is implemented via at least one processor.

10. The information processing device according to claim 9, wherein the setting unit further sets a target value of an environmental condition for an operation of the electronic apparatus.

11. The information processing device according to claim 1, further comprising:
a setting unit configured to set an operation of the electronic apparatus on a basis of a measurement result acquired from the measurement apparatus as an operation input in a case in which the electronic apparatus is determined to be set as an apparatus that uses the measurement result from the measurement apparatus as the operation input by the determination unit,
wherein the setting unit is implemented via at least one processor.

12. The information processing device according to claim 1, wherein the environmental conditions include at least one of a non-biological condition and a biological condition.

13. The information processing device according to claim 1,
wherein the information processing device is mounted in the electronic apparatus, and
the information processing device further includes a communication unit configured to receive the second type information from the measurement apparatus,
wherein the communication unit is implemented via at least one processor.

14. The information processing device according to claim 1,
wherein the information processing device is mounted in the measurement apparatus, and
the information processing device further includes a communication unit configured to receive the first type information from the electronic apparatus,
wherein the communication unit is implemented via at least one processor.

15. The information processing device according to claim 1, further comprising:
a communication unit configured to receive the first type information from the electronic apparatus and receive the second type information from the measurement apparatus,
wherein the communication unit is implemented via at least one processor.

16. The information processing device according to claim 1, wherein the determination unit further includes a user interface unit configured to provide a user interface for causing a user to designate an environment among a plurality of environments to be associated with at least one of the electronic apparatus and the measurement apparatus.

17. An electronic apparatus comprising:
an operation unit configured to perform an operation that affects at least one of a plurality of environmental conditions; and
a control unit configured to set the operation unit to use a measurement result from a measurement apparatus, which measures at least one of the plurality of environmental conditions, as an operation input in accordance with a result of determination based on a comparison of first type information representing an affected condition type of environmental condition affected by the operation unit and second type information representing a measurement condition type of environmental condition measured by the measurement apparatus,
wherein the operation unit and the control unit are each implemented via at least one processor.

18. An information processing method executed by an information processing device, the information processing method comprising:

acquiring first type information representing an affected condition type of environmental condition affected by an electronic apparatus that affects at least one of a plurality of environmental conditions;

acquiring second type information representing a measurement condition type of environmental condition measured by a measurement apparatus that measures at least one of the plurality of environmental conditions; and determining whether the electronic apparatus is to be set as an apparatus that uses a measurement result from the measurement apparatus as an operation input on a basis of a comparison of the first type information and the second type information.

19. An operation method of an electronic apparatus that includes an operation unit configured to perform an operation that affects at least one of a plurality of environmental conditions, the operation method comprising:

setting the operation unit to use a measurement result from a measurement apparatus, which measures at least one of the plurality of environmental conditions, as an operation input in accordance with a result of determination based on a comparison of first type information representing an affected condition type of environmental condition affected by the operation unit and second type information representing a measurement condition type of environmental condition measured by the measurement apparatus; and performing the operation using a measurement result from the measurement apparatus as an operation input in accordance with the setting.

20. A non-transitory computer-readable medium having embodied thereon a program, which when executed by a computer causes the computer to execute a method, the method comprising:

determining, on a basis of a comparison of first type information representing an affected condition type of environmental condition affected by an electronic apparatus that affects at least one of a plurality of environmental conditions and second type information representing a measurement condition type of environmental condition measured by a measurement apparatus that measures at least one of the plurality of environmental conditions, whether the electronic apparatus is to be set as an apparatus that uses a measurement result from the measurement apparatus as an operation input.

21. A non-transitory computer-readable medium having embodied thereon a program, which when executed by a processor of an electronic apparatus, which includes an operation unit configured to perform an operation that affects at least one of a plurality of environmental conditions, causes the processor to execute a method, the method comprising:

setting the operation unit to use a measurement result from a measurement apparatus, which measures at least one of the plurality of environmental conditions, as an operation input in accordance with a result of determination based on a comparison of first type information representing an affected condition type of environmental condition affected by the operation unit and second type information representing a measurement condition type of environmental condition measured by the measurement apparatus.

* * * * *